United States Patent
Wang et al.

(10) Patent No.: US 10,813,132 B2
(45) Date of Patent: Oct. 20, 2020

(54) FIRST AND SECOND WIRELESS DEVICE AND A NETWORK NODE, AND METHODS PERFORMED THEREBY, FOR PERFORMING A RANDOM ACCESS PROCEDURE

(71) Applicant: Telefonaktiebolaget L M Ericsson (publ), Stockholm (SE)

(72) Inventors: Min Wang, Luleå (SE); Jan Christoffersson, Luleå (SE); Mårten Ericson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1085 days.

(21) Appl. No.: 14/777,578

(22) PCT Filed: Sep. 4, 2015

(86) PCT No.: PCT/SE2015/050938
§ 371 (c)(1),
(2) Date: Sep. 16, 2015

(87) PCT Pub. No.: WO2017/039513
PCT Pub. Date: Mar. 9, 2017

(65) Prior Publication Data
US 2017/0265227 A1 Sep. 14, 2017

(51) Int. Cl.
*H04W 74/08* (2009.01)
*H04W 72/04* (2009.01)
(Continued)

(52) U.S. Cl.
CPC ....... *H04W 74/0833* (2013.01); *H04W 72/04* (2013.01); *H04W 76/11* (2018.02); *H04W 4/70* (2018.02); *H04W 72/121* (2013.01)

(58) Field of Classification Search
CPC ............ H04W 74/0833; H04W 72/04; H04W 76/021; H04W 76/11
(Continued)

(56) References Cited

U.S. PATENT DOCUMENTS

2007/0160003 A1* 7/2007 Meier ................... H04W 74/02
370/329
2013/0343256 A1* 12/2013 Zakrzewski ............ H04W 8/26
370/312
(Continued)

FOREIGN PATENT DOCUMENTS

| WO | 2005060174 A1 | 6/2005 |
| WO | 2014092616 A1 | 6/2014 |
| WO | 2014096765 A1 | 6/2014 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.6.0, Jun. 2015, 1-254.
(Continued)

*Primary Examiner* — Ricky Q Ngo
*Assistant Examiner* — Ellen A Kirillova
(74) *Attorney, Agent, or Firm* — Murphy, Bilak & Homiller, PLLC

(57) ABSTRACT

A first wireless device, a second wireless device, a network node and respective methods performed thereby for performing random access are provided. The first wireless device, the second wireless device and the network node are operable in a wireless communication network. The method performed by the first wireless device comprises receiving (105) from the network node, a configuration that the first wireless device and one or more second wireless devices are part of a group, and that the first wireless device shall act as
(Continued)

a coordinator for the group, wherein wireless devices in the group are capable of direct mode communication, D2D; and receiving (120) one or more resource requests from respective one or more second wireless devices in the group, wherein each one of the resource requests are received over a D2D link, between the first wireless device and the respective one or more second wireless devices. The method further comprises transmitting (160) a random access request to the network node, which random access request relates to requested resources according to the received one or more resource requests from the group.

44 Claims, 16 Drawing Sheets

(51) Int. Cl.
*H04W 76/11* (2018.01)
*H04W 4/70* (2018.01)
*H04W 72/12* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2014/0003320 A1* | 1/2014 | Etemad | ................... | H04W 4/06 370/312 |
| 2014/0010173 A1* | 1/2014 | Zakrzewski | ............ | H04W 8/26 370/329 |
| 2014/0133430 A1* | 5/2014 | Yang | .................... | H04L 5/0055 370/329 |
| 2014/0314057 A1* | 10/2014 | Van Phan | ......... | H04W 56/0045 370/336 |
| 2014/0328258 A1 | 11/2014 | Cheng et al. | | |
| 2015/0011230 A1* | 1/2015 | Noh | ....................... | H04W 72/04 455/450 |
| 2015/0146687 A1* | 5/2015 | Kim | ....................... | H04W 4/70 370/331 |
| 2015/0358860 A1* | 12/2015 | Lu | ......................... | H04W 36/08 370/331 |
| 2016/0105786 A1* | 4/2016 | Suryavanshi | ........... | H04W 4/08 455/434 |
| 2016/0338095 A1* | 11/2016 | Faurie | ............... | H04W 28/0278 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.6.0, Jun. 2015, 1-136.
3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.6.0, Jun. 2015, 1-77.
Chang, Yunyan, et al., "Coordinated Random Access Management for Network Overload Avoidance in Cellular Machine-to-Machine Communications", European Wireless 2014; 20th European Wireless Conference, May 14-16, 2014, pp. 1-6.
Farhadi, Golnaz, et al., "Group-Based Signaling and Access Control for Cellular Machineto- Machine communication", 2013 IEEE 78th Vehicular Technology Conference (VTC Fall), Sep. 2-5, 2013, pp. 1-6.
Laya, Andres, et al., "Is the Random Access Channel of LTE and LTE-A Suitable for M2M Communications? a 'Survey of Alternatives", IEEE Communications Surveys & Tutorials, Dec. 5, 2013, pp. 1-13.

* cited by examiner

FIRST AND SECOND WIRELESS DEVICE AND A NETWORK NODE, AND METHODS PERFORMED THEREBY, FOR PERFORMING A RANDOM ACCESS PROCEDURE

TECHNICAL FIELD

The present disclosure relates to wireless communication and in particular to a random access procedure.

BACKGROUND

Cellular networks are evolving towards the so-called networked society, which means that devices that benefit from connectivity will also use the connectivity. Thus, the number of devices may grow substantially. One type of traffic that is expected to contribute to this growth is Machine Type Communication, MTC.

Networks with a high number of devices such as e.g. MTC devices may face different challenges compared to legacy networks where the main focus is to maximise user throughput and maintain high coverage and mobility. When the number of e.g. low rate devices such as MTC devices is high, the control channel resources could be limited since each single device needs to establish its own radio connection to the network which is associated with its own control channel and corresponding resource occupation, for example, preamble resource for Random Access Channel, RACH, Physical Uplink Control Channel, PUCCH and Physical Downlink Control Channel, PDCCH, etc. Thus, how to avoid congestion when a massive amount of MTC devices are accessing the network is a relevant question. One method to reduce the amount of RACH accesses may be to group similar devices and when one of the devices performs a RACH access, the network sends a message to stop the other devices from making a RACH access and instead sequentially assign uplink resources for the other devices in the group. This technique assumes that the devices that the network has selected as a group will have data to transmit at approximately the same time. Furthermore, the method will not scale efficiently since there will be a lot of extra signalling and devices that are assigned resources but may not have data to transmit.

SUMMARY

The object is to obviate at least some of the problems outlined above. In particular, it is an object to provide a first wireless device, a second wireless device, a network node and respective methods performed thereby for the wireless devices requesting resources from the network node. These objects and others may be obtained by providing a first wireless device, a second wireless device, and a network node and a respective method performed by a first wireless device, a second wireless device, and a network node according to the independent claims attached below.

According to an aspect, a method performed by a first wireless device for requesting resources from a network node is provided. The first wireless device, one or more second wireless devices, and the network node are operable in a wireless communication network. The method comprises receiving, receiving from the network node, a configuration that the first wireless device and one or more second wireless devices are part of a group, and that the first wireless device shall act as a coordinator for the group, wherein wireless devices in the group are capable of direct mode communication, D2D; and receiving one or more resource requests from respective one or more second wireless devices in the group, wherein each one of the resource requests are received over a D2D link, between the first wireless device and the respective one or more second wireless devices. The method also comprises transmitting a random access request to the network node, which random access request relates to requested resources according to the received one or more resource requests from the group.

According to an aspect, a method performed by a second wireless device for requesting resources from a network node is provided. The second wireless device, a first wireless device and the network node are operable in a wireless communication network. The method comprises receiving, from the network node, a configuration that the first wireless device and the second wireless device are part of a group, and that the first wireless device shall act as a coordinator for the group, wherein wireless devices in the group are capable of direct mode communication, D2D; and requesting resources from the network node by transmitting over a D2D link, a resource request to the first wireless device, for being forwarded in a random access request to the network node together with any resource requests from respective one or more other second wireless devises in the group.

According to an aspect, a method performed by a network node for supporting device first wireless device and one or more second wireless devices requesting resources from the network node, wherein the first wireless device, the one or more second wireless devices and the network node are operable in a communication network. The method comprises sending to the first wireless device and the one or more second wireless devices, a configuration that the first wireless device and one or more second wireless devices are part of a group, and that the first wireless device shall act as a coordinator for the group by using direct mode communication, D2D; and receiving a random access request from the first wireless device, which random access request relates to one or more resource requests that the first wireless device has received via a D2D link from the one or more second wireless devices in the group.

According to an aspect, a first wireless device for requesting resources from a network node is provided. The first wireless device, one or more second wireless devices, and the network node are operable in a wireless communication network. The first wireless device is configured for receiving from the network node, a configuration that the first wireless device and one or more second wireless devices are part of a group, and that the first wireless device shall act as a coordinator for the group, wherein wireless devices in the group are capable of direct mode communication, D2D; and for receiving one or more resource requests from respective one or more second wireless devices in the group, wherein each one of the resource requests are received over a D2D link, between the first wireless device and the respective one or more second wireless devices. The first wireless device is further configured for transmitting a random access request to the network node, which random access request relates to requested resources according to the received one or more resource requests from the group.

According to an aspect, a second wireless device for requesting resources from a network node is provided. The second wireless device, a first wireless device and the network node are operable in a wireless communication network. The second wireless device is configured for receiving, from the network node, a configuration that the first wireless device and the second wireless device are part of a group, and that the first wireless device shall act as a coordinator for the group, wherein wireless devices in the group are capable of direct mode communication, D2D; and for requesting resources from the network node by transmitting over a D2D link, a resource request to the first wireless device, for being forwarded in a random access request to the network node together with any resource requests from respective one or more other second wireless devises in the group.

According to an aspect, a network node for device first wireless device and one or more second wireless devices requesting resources from the network node, wherein the first wireless device, the one or more second wireless devices and the network node are operable in a communication network. The network node is configured for sending to the first wireless device and the one or more second wireless devices, a configuration that the first wireless device and one or more second wireless devices are part of a group, and that the first wireless device shall act as a coordinator for the group by using direct mode communication, D2D; and for receiving a random access request from the first wireless device, which random access request relates to one or more resource requests that the first wireless device has received via a D2D link from the one or more second wireless devices in the group.

The first wireless device, the second wireless device, the network node and the respective methods performed thereby have several possible advantages. One possible advantage is that the intensity of the random access attempts, e.g. number of random access attempts per time unit, from the group may be reduced compared to if the group members did individual random access attempts as in legacy procedure. Another possible advantage is that the intensity of the coordinated random access can be controlled by the network by setting the group size and a delay to suitable values.

BRIEF DESCRIPTION OF DRAWINGS

Embodiments will now be described in more detail in relation to the accompanying drawings, in which.

DETAILED DESCRIPTION

A method performed by a first wireless device, a method performed by a second wireless device, a method performed by a network node as well as a first wireless device, a second wireless device and a network node are provided. The first wireless device acts as a coordinator for a group of wireless devices capable of Device to Device, D2D, communication, also referred to as direct mode communication, and the second wireless device is part of the group. Wireless devices such as the second wireless device that are members of the group should not transmit random access requests to the network node, but instead send resources requests to the first wireless device. The first wireless device may then collectively request resources for the wireless devices in the group by sending a random access request to the network node, the random access request relating to requested resources according to the received one or more resource requests from the group.

Figure 1A:
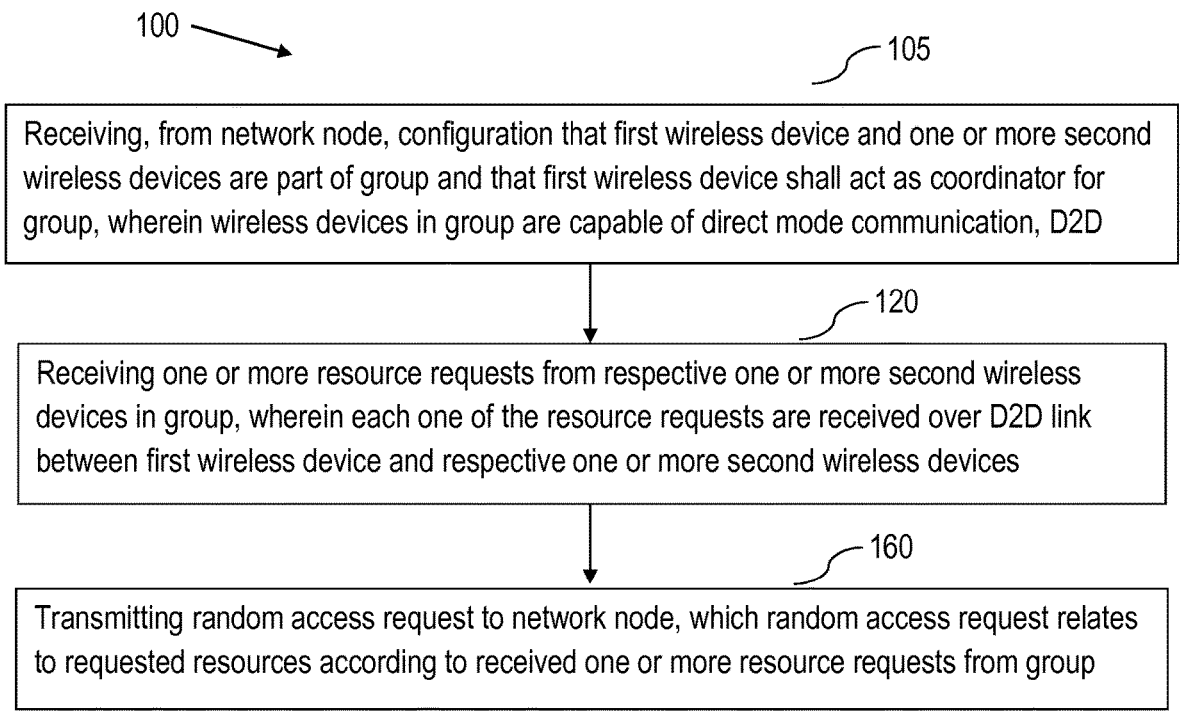
FIG. 1a is a flowchart of a method performed by a first wireless device for performing random access to a network node according to an exemplifying embodiment.

Embodiments herein relate to such a method performed by a first wireless device for requesting resources from a network node, wherein the first wireless device, one or more second wireless devices and the network node are operable in a wireless communication network. Different embodiments of such a method will now be described with reference to FIGS. 1a-1d. FIG. 1a illustrates the method comprising receiving 105 from the network node, a configuration that the first wireless device and one or more second wireless devices are part of a group, and that the first wireless device shall act as a coordinator for the group, wherein wireless devices in the group are capable of direct mode communication, D2D; and receiving 120 one or more resource requests from respective one or more second wireless devices in the group, wherein each one of the resource requests are received over a D2D link, between the first wireless device and the respective one or more second wireless devices. The method also comprises transmitting 160 a random access request to the network node, which random access request relates to requested resources according to the received one or more resource requests from the group.

The group of wireless devices may comprise a number of wireless devices, e.g. two, three, four or more, but for simplicity reasons, the group will most often be described comprising the first and the second wireless device; wherein the second wireless device may be one wireless device or a plurality of second wireless devices. The group may be pre-configured, e.g. by the network node or a higher layer node. As will be described in more detail below, the network node may be e.g. a base station such as a NodeB or eNodeB, a base station controller, BSC, Radio Network Controller, RNC, a node in an Operation, Administration and Maintenance, OAM, system or a node in an Operation Support System, OSS.

The method comprises the first wireless device receiving, from the network node, the configuration that the first wireless device and one or more second wireless devices are part of the group, and that the first wireless device shall act as the coordinator for the group, wherein wireless devices in the group are capable of D2D communication. Once the first wireless device has received the configuration, the first wireless device is informed of which wireless devices that are part of the group for which the first wireless device is acting as coordinator.

The first wireless device may then receive one or more resource requests from respective one or more second wireless devices in the group, wherein each one of the resource requests are received over a D2D link, between the first wireless device and the respective one or more second wireless devices.

Figure 4A:
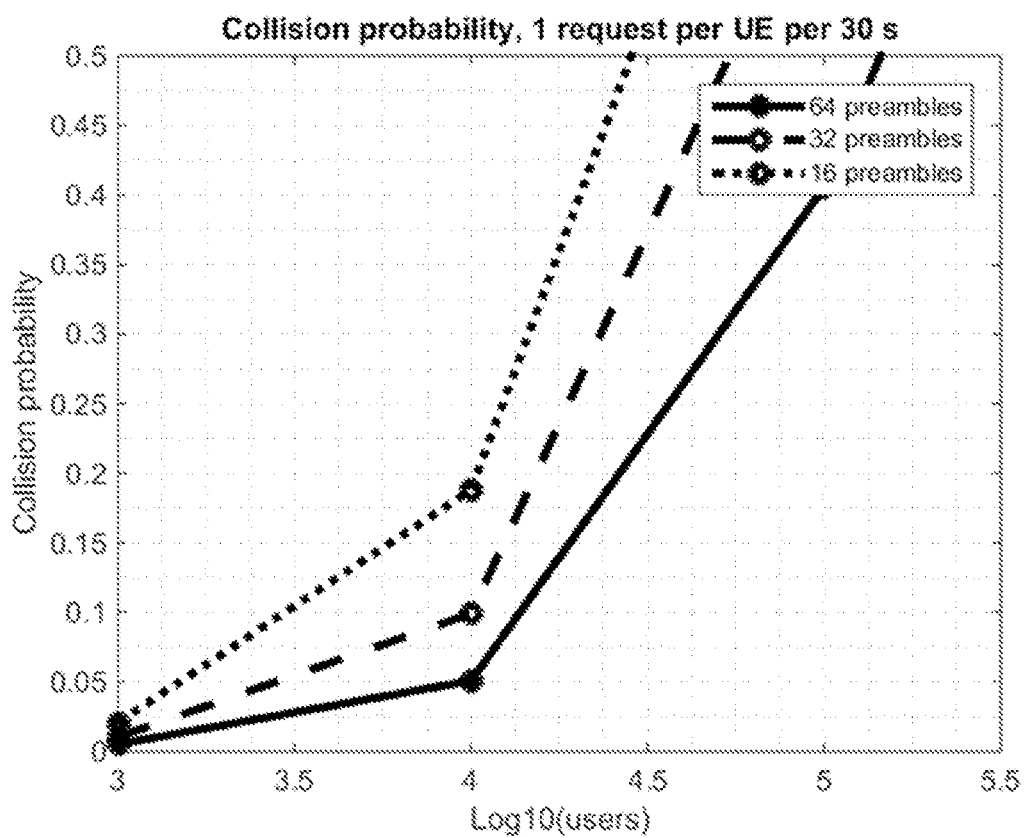
FIG. 4a is a graph illustrating the collision probability with "ordinary" individual random access attempts.
Figure 4B:
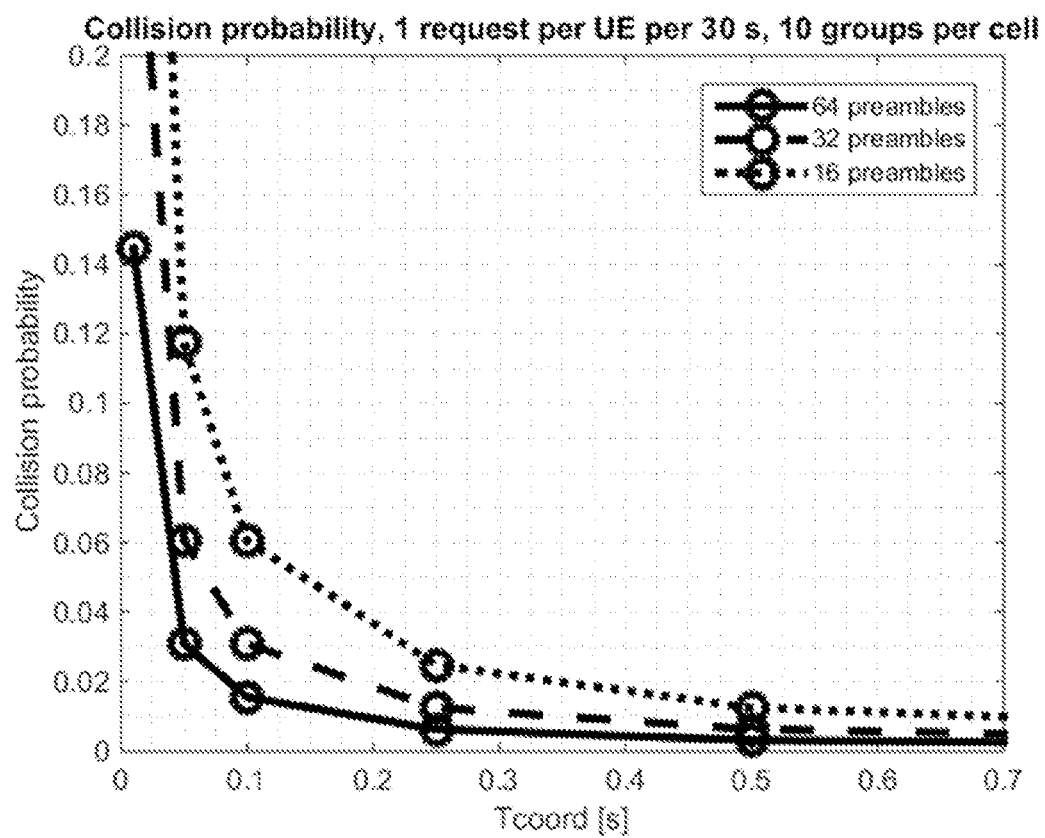
FIG. 4b is a graph illustrating the case when coordinated RACH access is used.
Figure 4C:
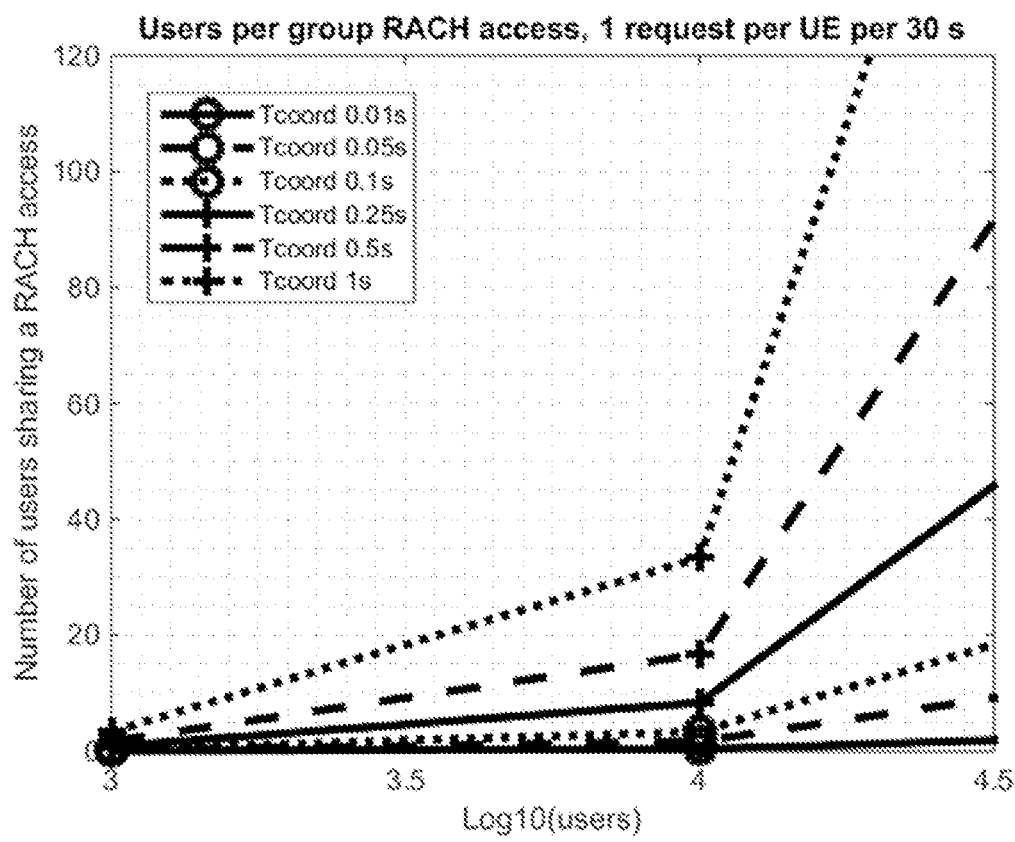
FIG. 4c is a graph illustrating the number of users sharing a group RACH access for a given T_coord for different number of users in the cell.
Figure 4D:
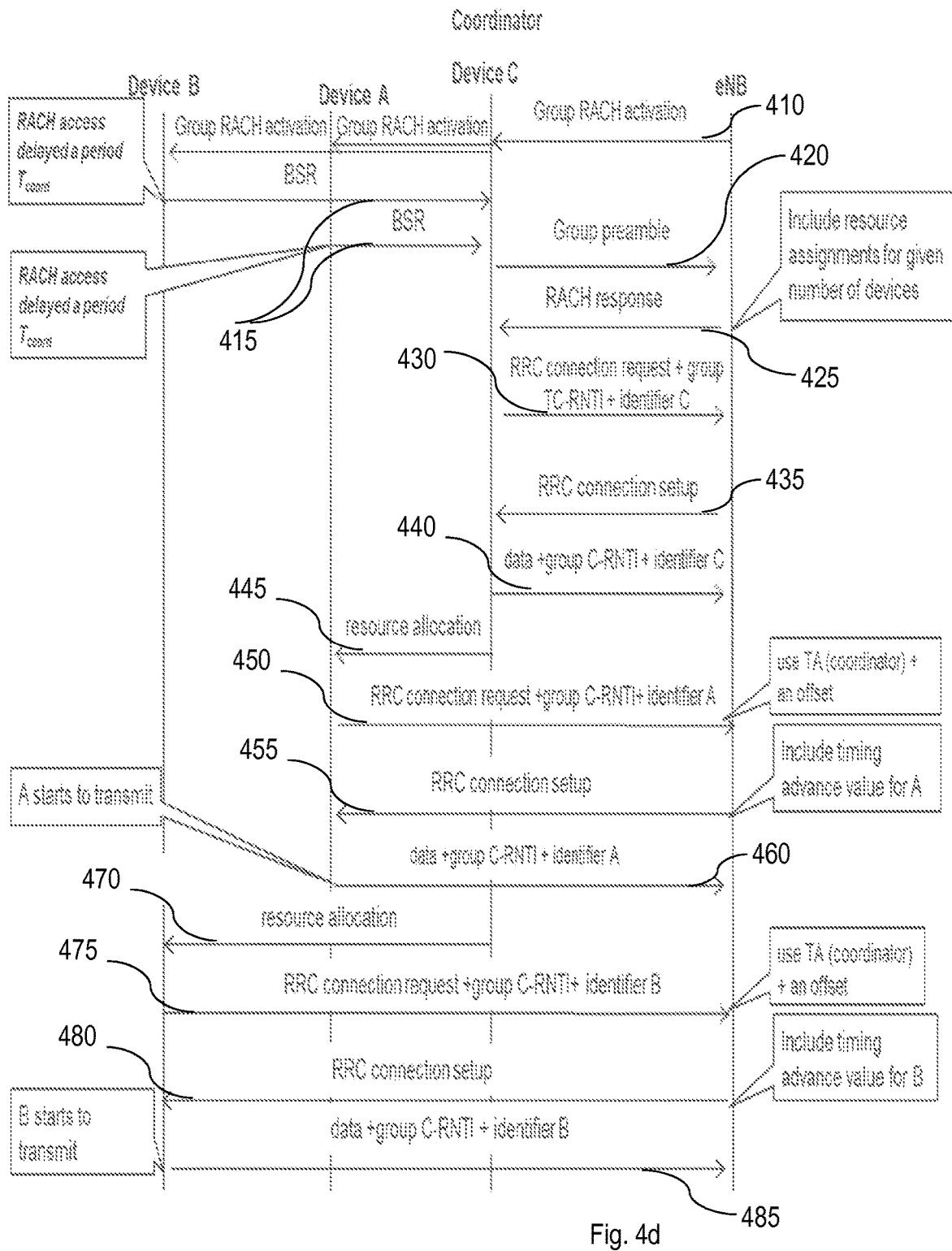
FIG. 4d is an exemplifying signalling diagram of three wireless devices requesting resources from a network node.

Once the first wireless device has received at least one resource request from at least one other second wireless device, the first wireless device transmits the random access request to the network node, which random access request relates to requested resources according to the received one or more resource requests from the group, see also FIG. 4d action 420. The random access request may in this disclosure also be referred to as a group random access request.

The random access request is a request for resources for all wireless devices from which the first wireless devices has received resource request. Thus, the random access request is transmitted by the first wireless device in response to one or more wireless devices in the group having sent resource requests to the first wireless device. The first wireless device may also need resources, but the random access request may be transmitted by the first wireless device without the first wireless device requesting resources itself. The random access request may correspond to the so-called Msg1 of the Random Access Channel, RACH, procedure as specified by the third Generation Partnership Project, 3GPP, e.g. TS 36.321, Evolved Universal Terrestrial Radio Access (E-UTRA); Medium Access Control (MAC) protocol specification.

The method performed by the first wireless device has several possible advantages. One possible advantage is that the intensity of the random access attempts, e.g. number of random access attempts per time unit, from the group may be reduced compared to if the group members did individual random access attempts as in legacy procedure. Another possible advantage is that the intensity of the coordinated random access can be controlled by the network by setting the group size and a delay to suitable values.

Figure 1B:
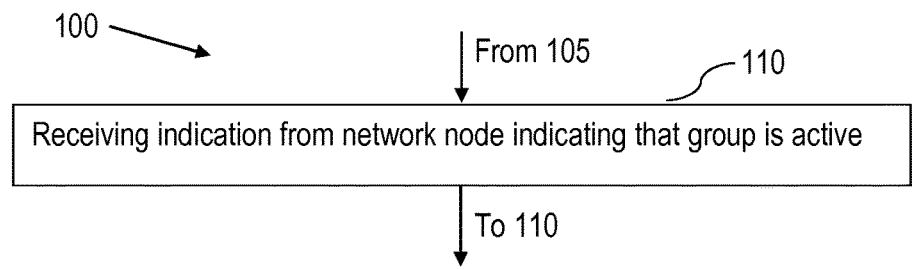
FIG. 1b is a flowchart of a method performed by a first wireless device for performing random access to a network node according to yet an exemplifying embodiment.

In an example, illustrated in FIG. 1b, the method further comprises receiving 110 an indication from the network node indicating that the group is active.

The indication may be a separate message to indicate to the first wireless device that the group is henceforth active, or the reception of the configuration itself may serve as the indication that the group is active. Further, the configuration may comprise the indication that the group is active. See also FIG. 4d action 410 (where "Device C" acts as coordinator and both "Device A" and "Device B" are acting as a second communication device). The group configuration comprises information about which wireless devices are part of the group as described above. The network node may have configured the group and sent the group configuration beforehand, wherein the group is configured but not active. Once the indication that the group is active is received, each wireless device in the group as specified by the configuration will be acting as part of the group. As will be described in more detail below, the indication is sent to all wireless devices in the group.

When the group is active, the wireless devices in the group should no longer send random access requests individually to the network node, but instead the first wireless device acts as a coordinator for the group. Consequently, when a wireless device in the group needs resources, the wireless device goes via the first wireless device in order for the first wireless device to collectively request for resources for the wireless devices in the group.

As a consequence, once the group is activated, the first wireless device receives a resource request from the second wireless device, see also FIG. 4d action 415. Again it is pointed out that there may be a plurality of wireless device in the group and that the first wireless device may receive resource requests from more than just the second wireless device.

In an example, the random access request comprises aggregated resource requests from the wireless devices that have data to transmit.

By transmitting the random access request, the first wireless device requests resources for all wireless devices from which the first wireless devices has received resource request.

In order for the network node to make a decision on assigning resources to the group of wireless devices, the random access request may comprise aggregated information of the wireless devices associated with the random access request.

The respective resource request from the one or more second wireless devices in the group may comprise a Buffer Status Report, BSR, wherein the first wireless device reports the aggregated BSR to the network node during the random access request procedure.

The BSR is indicative of how much data the second wireless device(s) need to transmit and is thus indicative of how much resources the second wireless device(s) is requesting.

As described above, there may be a plurality of different wireless devices that are part of the group. Merely as a simplified and illustrating example, assume the group comprises five wireless devices: WD2, WD3, WD4, WD5 and WD6 in addition to the first wireless device, WD1. Assume further that WD2, WD4 and WD5 request resources by sending respective resource requests to WD1. The respective WD2, WD4 and WD5 include their BSR: BSR2, BSR4 and BSR5. Consequently, the first wireless device, WD1, transmits the aggregated BSR to the network node comprising aggregated information relating to BSR2, BSR4 and BSR5 during the random access procedure.

In this manner, the network node is provided with information as to how much resources are needed by the wireless devices WD2, WD4 and WD5, and requested for, by the random access request.

The random access request may use a random access preamble indicating that the random access request is a random access request for a group of wireless devices.

When the first wireless device transmits the random access request, the first wireless device selects a random access preamble out of a number of random access preambles. The available preambles may be divided into normal preambles (used by non-group wireless devices) and group preambles which may be used by the first wireless device to indicate to the network node that the random access request is. a random access request for a group of wireless devices.

The preamble split may be static or semi static depending on the cell load or cell size and number of groups, or even fully dynamically configured depending on short terms measurement of the system load. The configuration information of the preamble split may be signalled to devices via System Information Block, SIB, signalling or together with the dedicated Radio Resource Control, RRC, signalling.

The first wireless device acting as a group coordinator may randomly select the preamble in the group preamble split. The network node may thus identify whether the received random access preamble is for a group or for a single wireless device.

This has the advantage that since the group only needs one pre-amble out of the total available preambles the number of pre-ambles that are available for example for critical services is increased substantially.

Figure 1C:
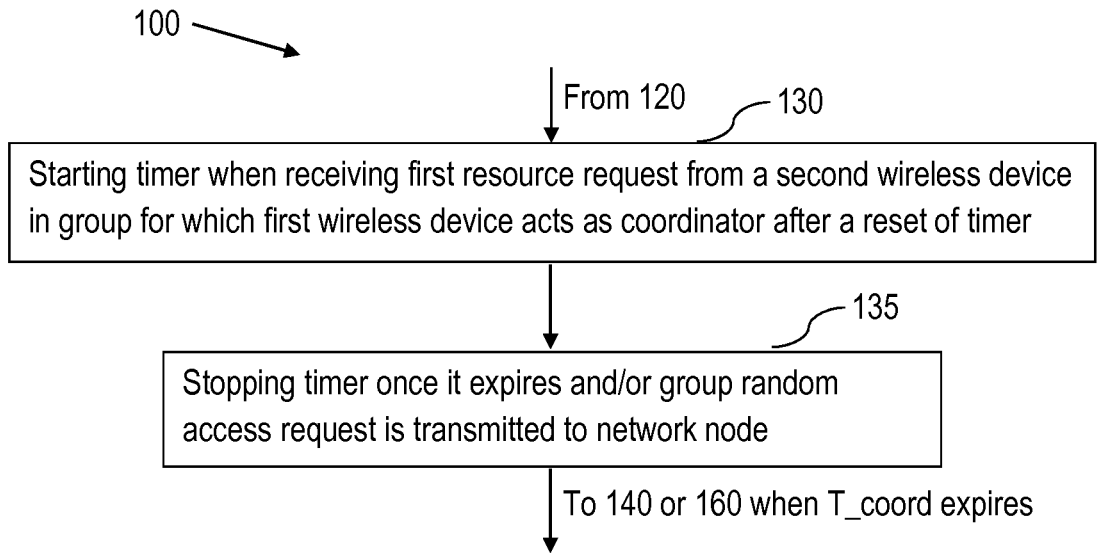
FIG. 1c is a flowchart of a method performed by a first wireless device for performing random access to a network node according to still an exemplifying embodiment.

In an example illustrated in FIG. 1c, the method further comprises starting 130 a timer when receiving a first resource request from a second wireless device in the group for which the first wireless device acts as a coordinator, and postponing the transmitting 160 of the random access request until the timer expires.

In order to both delay the transmission of the random access request and to make sure that a number of wireless device are included in the random access request, the first wireless device may wait for a certain period of time from receiving the first resource request from a wireless device in the group for which the first wireless device acts as a coordinator until it transmits the random access request.

By waiting a certain time from receiving the first resource request before it transmits the random access request, the first wireless device may receive further resource requests from other wireless devices in the group. Then, at expiration of the timer, the first wireless device transmits the random access request which is associated with the resource requests that the first wireless device has received during the time the first wireless device waited. The timer is in this disclosure called T_coord.

One example of postponing the transmitting 160 of the random access request is to set a timer T_coord to a value T_coord_max specifying the certain time that the first wireless device should wait before transmitting the random access request. Thus, once the first wireless device receives the first resource request from one of the wireless devices in the group, the first wireless device starts the timer and waits (and possible receives other resource requests from other wireless devices in the group). When the timer T_coord expires, i.e. reaches the value of T_coord_max, the first wireless device is done waiting and transmits the random access request to the network node.

In a further example, the method further comprises stopping 135 the timer once it expires and/or the random access request is transmitted to the network node.

As described above, during the duration of the timer T_coord, the first wireless device may receive additional resource requests from other wireless devices in the group. Once the timer T_coord expires, the first wireless device stops it and transmits the random access request to the network node.

The random access request is then associated with all the resource requests that the first wireless device received from wireless device in the group while the timer T_coord was running.

By delaying the transmission of the random access request, several resource requests may be received by the first wireless device, which results in a reduced intensity of random access requests being transmitted to the network node. It shall be noted that in this disclosure that a transmission of a random access request corresponds to a random access attempt.

Figure 1D:
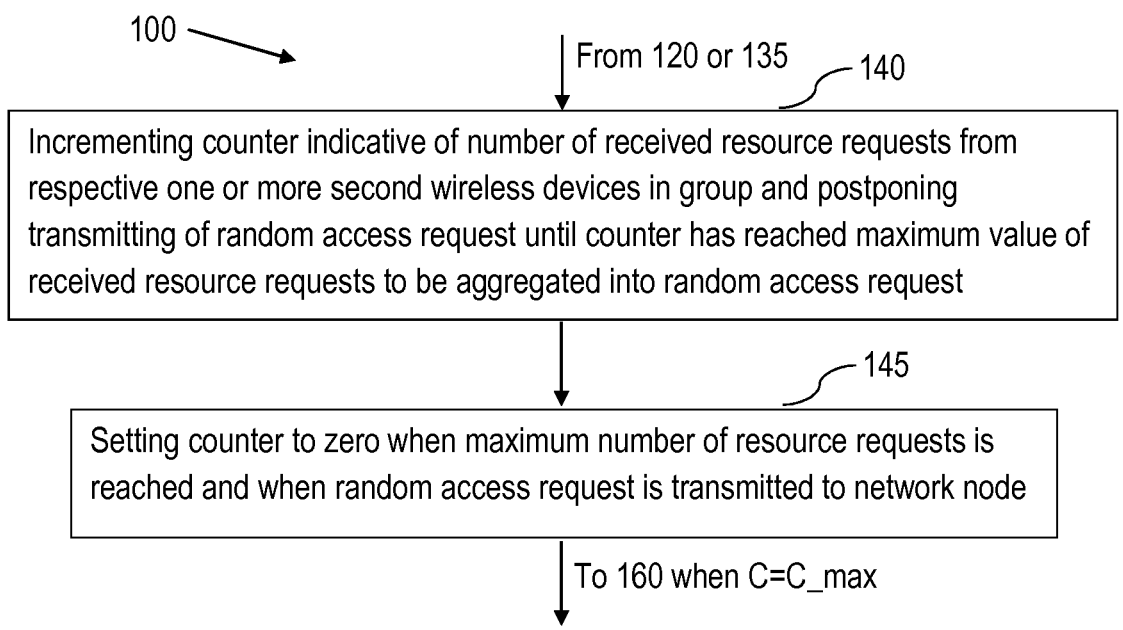
FIG. 1d is a flowchart of a method performed by a first wireless device for performing random access to a network node according to a further exemplifying embodiment.

In yet a further example illustrated in FIG. 1d, the method further comprises incrementing 140 a counter indicative of a number of received resource requests from respective one or more second wireless devices in the group and postponing the transmitting 160 of the random access request until the counter has reached a maximum value of received resource requests to be aggregated into the random access request.

Still further, the first wireless device may set the counter to zero when the maximum number of resource requests is reached, and when the random access request is transmitted to the network node.

The first wireless device may additionally or alternatively to waiting by starting and stopping the timer T_coord as explained above use the counter C in order to make sure that the random access request is associated with more than one wireless device and also that it is not associated with too many wireless devices.

It may be that the random access request should not be associated with more than a specific number or wireless devices, represented by a value of C_max. Then the first wireless device may increment the counter C each time the first wireless device receives a resource request from a wireless device in the group. The counter C is set to zero after a random access request has been transmitted and then C is incremented to one when the first resources request from a wireless device in the group is received thereafter.

The first wireless device increments C for every resource request it receives and compares C to C_max. When C reaches C_max, the first wireless device transmits the random access request.

The timer T_coord and the counter C may be combined so that for example the first wireless device waits, or postpones the transmitting of the random access request until either T_coord expires or C reaches C_max. Once T_coord expires by reaching the value of T_coord_max or C reaches C_max, the first wireless device transmits the random access request and also sets C to zero and stops T_coord. Then when a resource request is received thereafter, the first wireless device starts T_coord and increments C to one.

By the value of C_max, it is ensured that the random access request is not associated with too many individual wireless devices in the group. The value of C_max may be preconfigured or set by the network node and signalled to the network node.

Figure 1E:
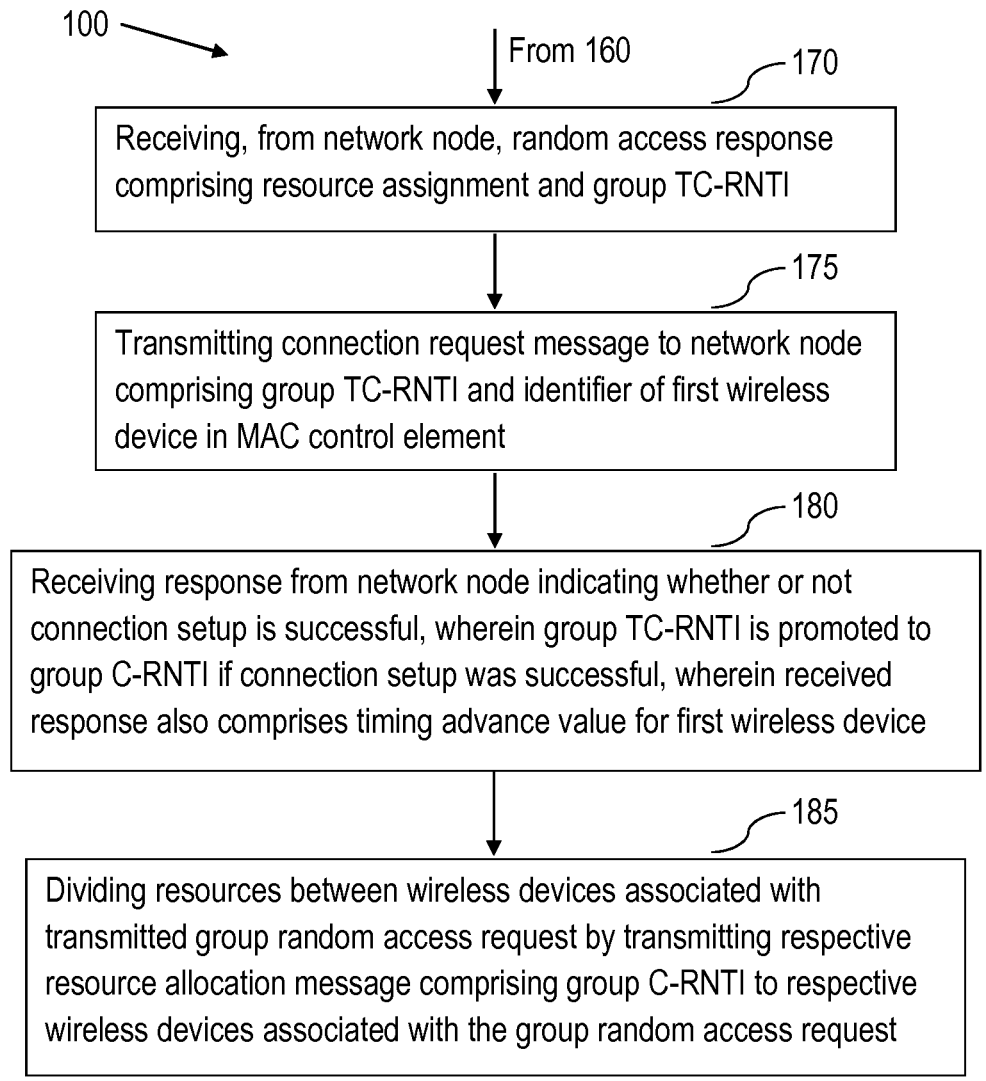
FIG. 1e is a flowchart of a method performed by a first wireless device for performing random access to a network node according to yet an exemplifying embodiment.

The method may further comprise, as illustrated in FIG. 1e, receiving (170), from the network node, a random access response comprising a resource assignment and a group temporary Cell Radio Network Temporary Identity, group TC-RNTI, and dividing (185) the resources between the wireless devices associated with the transmitted random access request by transmitting, via respective D2D link, a respective resource allocation message comprising a group C-RNTI to the respective wireless devices associated with the random access request.

The random access response comprises an uplink grant field indicating the resources to be used on the uplink by the wireless devices including the first device and one or more second devices, see also FIG. 4d action 425. The random access response may comprise a MAC entity of the first device as well as the group TC-RNTI which may be used by the MAC entity during Random Access, and Timing Advance Information to be used by the first wireless device to control the amount of timing adjustment that the MAC entity has to apply, with regard to the first wireless device and the network node. Thus, by means of the TC-RNTI the group of wireless devices is identified and by means of an identifier of the first wireless device (e.g. the MAC entity of the first wireless device), the first wireless device being the coordinator for the group is identified as recipient. In this manner, any possible random access collision is resolved.

The first wireless device divides 185 the resources between the wireless devices associated with the transmitted random access request by transmitting a respective resource allocation message comprising the group C-RNTI to the respective wireless devices associated with the random access request, see also FIG. 4d actions 445 and 470.

Since the received random access response from the network node is received in response to the transmitted random access request, the random access response is intended for the wireless devices that are associated with the transmitted random access request. Consequently, the resource assignment is associated with those wireless devices.

In this manner, the wireless devices that transmitted resource requests to the first wireless device are provided with a respective resource allocation message comprising the group C-RNTI. This in turn enables those wireless devices to transmit respective connection request messages to the network node in order to set up a connection to the network node, see also FIG. 4d actions 430, 45 and 475.

The random access response may correspond to the so-called Msg2 of the RACH procedure as specified by 3GPP, see also FIG. 4d action 425.

The method 100 may further comprise, as illustrated in FIG. 1e, transmitting 175 a connection request message to the network node, the connection request comprising the group TC-RNTI and an identifier of the first wireless device in a Media Access Control, MAC, control element; and receiving 180 a response from the network node indicating whether or not the connection setup is successful, wherein the group TC-RNTI is promoted to group C-RNTI if the connection setup is successful, wherein the received response also comprises a timing advance value for the first wireless device.

By the connection request, see also FIG. 4d action 430, the first wireless device requests a connection to be set up between the first wireless device and the network node. In order for the network node to be able to identify the sender of the connection request message, the first wireless device includes both the group TC-RNTI identifying the group of which the first wireless device is part and the identifier of the first wireless device which identifies the first wireless device in the group.

The connection setup may be successful or unsuccessful. The network node transmits a response to the first wireless device informing the first wireless device of the success or failure in the setting up of the connection, see also FIG. 4d action 435. In the case the connection setup is successful, the response comprises either the group C-RNTI or an indication to the first wireless device that the group TC-RNTI is promoted to the group C-RNTI. In order for the first wireless device and the network node to be synchronised, the network node also encloses the timing advance value for the first wireless device in the response message.

The method may still further comprise receiving a value of T_coord_max and/or C_max from the network node, wherein the method further comprises using the value of T_coord_max and/or C_max for performing random access request to the network node.

It may be that the network node wants to update the value of C_max or the value for when T_coord is to expire. For example, those values may be specific to the network node and when a wireless device connects to a new network node, the value of C_max and/or the value for when T_coord is to expire, i.e. T_coord_max, may need to be updated.

Irrespective of the reason why, the values may be changed and sent to the first wireless device. The first wireless device receives the value of C max and/or the timer length for T_coord, T_coord_max, wherein the first wireless device starts using the received values for any upcoming random access request to the network node.

Figure 2A:
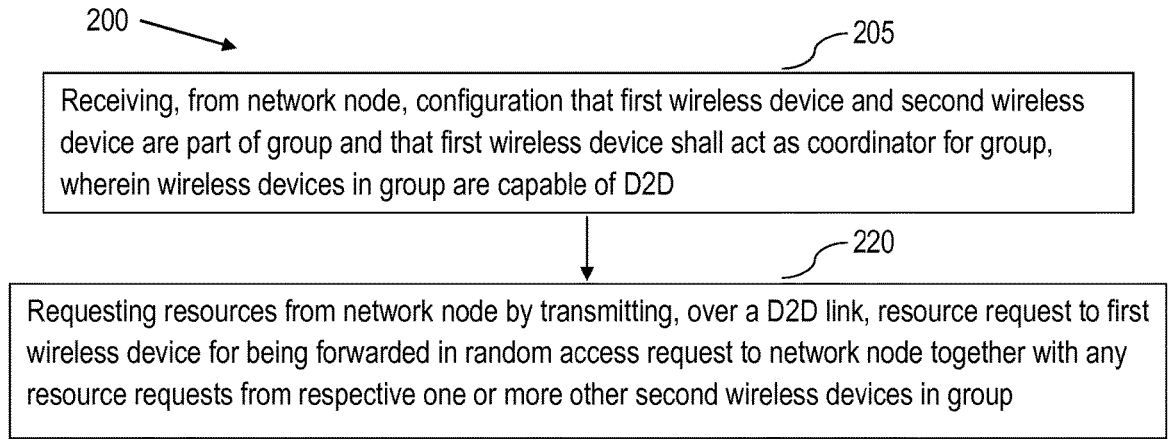
FIG. 2a is a flowchart of a method performed by a second wireless device for performing random access to a network node according to an exemplifying embodiment.

Embodiments herein also relate to a method performed by a second wireless device for requesting resources from a network node, wherein a first wireless device, the second wireless device and the network node are operable in a wireless communication network. Different embodiments of such a method will now be described with reference to FIGS. 2a to 2e. FIG. 2a illustrates the method comprising receiving 205, from the network node, a configuration that the first wireless device and the second wireless device are part of a group, and that the first wireless device shall act as a coordinator for the group, wherein wireless devices in the group are capable of direct mode communication, D2D; and requesting resources from the network node by transmitting (220), over a D2D link, a resource request to the first wireless device, for being forwarded in a random access request to the network node together with any resource requests from respective one or more other second wireless devises in the group.

When the second wireless device receives the configuration from the network node, the second wireless device is informed of which group it belongs to and which wireless device is acting as coordinator for the group, i.e. which wireless device in the group is the first wireless device.

Thus, when the second wireless device has data it needs to transmit, it may not transmit a random access request directly to the network node. Instead, the second wireless device has to go via the first wireless device in order to obtain resources to send the data it needs to send. Consequently, the second wireless device transmits the resource request to the first wireless device acting as coordinator for the group. See also FIG. 4d action 415.

The method performed by the second wireless device has the same several possible advantages as the method by the first wireless device. One possible advantage is that the intensity of the random access attempts, e.g. number of random access attempts per time unit, from the group may be reduced compared to if the group members did individual random access attempts as in legacy procedure. Another possible advantage is that the intensity of the coordinated random access can be controlled by the network by setting the group size and a delay to suitable values.

The method 200 may further comprise, as illustrated in FIG. 2a, receiving 210 an indication from the network node, indicating that the group is active.

As explained above with reference to the first wireless device, the indication may be a separate indication or the reception of the configuration may comprise the indication or may serve as the indication that the group is active.

When the second wireless device receives the indication that the group is active, the second wireless device is no longer allowed to transmit random access request directly to the network node. See also FIG. 4d action 410.

Figure 2B:
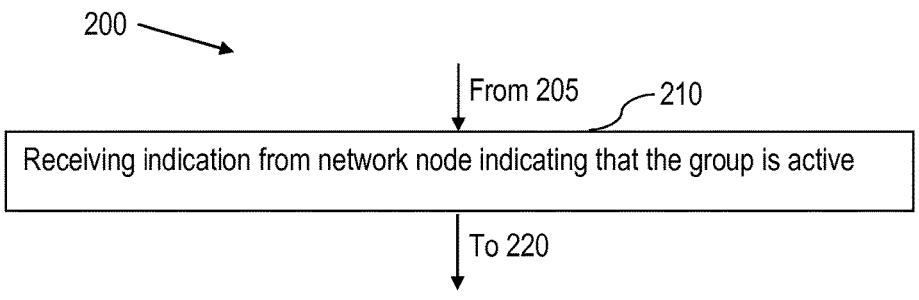
FIG. 2b is a flowchart of a method performed by a second wireless device for performing random access to a network node according to yet an exemplifying embodiment.
Figure 2C:
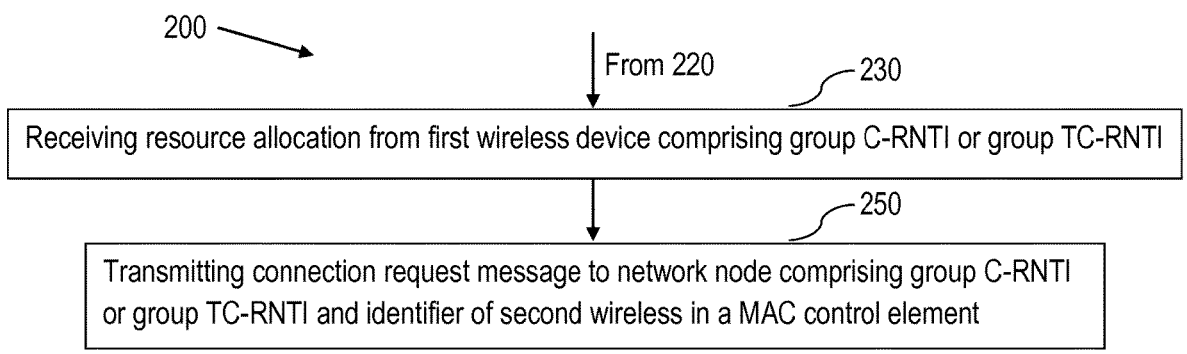
FIG. 2c is flowchart of a method performed by a second wireless device for performing random access to a network node according to still an exemplifying embodiment.

In an example, illustrated in FIG. 2c, the method comprises receiving 230 a resource allocation, via a D2D link from the first wireless device, comprising a group Cell Radio Network Temporary Identity, group C-RNTI; and transmitting 250 a connection request message to the network node, the connection request comprising the group C-RNTI and an identifier of the second wireless device in a MAC control element.

The second wireless device receives the resource allocation from the first wireless device, the resource allocation comprising the group C-RNTI. See also FIG. 4d actions 445 and 470. The first wireless device has obtained the group C-RNTI before transmitting the resource allocation message to the second wireless device, see also FIG. 4d action 435, wherein the resource allocation message may comprise the group C-RNTI.

Once the second wireless device receives the resource allocation from the first wireless device, the second wireless device may attempt to connect to the network node. To do so, the second wireless device transmits the connection request message to the network node, wherein the connection request message to the network comprises the group C-RNTI, see also FIG. 4d actions 450 and 475. The connection request message further comprises the identifier of the second wireless device so that the network node may differentiate the connection request message from other possible connection request message comprising the same group C-RNTI. The group C-RNTI and the identifier of the second wireless device may be comprised in e.g. a MAC control element. The MAC control element is comprised in MAC Packet Data Unit, PDU.

The connection request message and the connection setup message are used to resolve contention for resources. There may be multiple wireless devices accessing the same network node using the same preamble. During the random access procedure initiated by the coordinator, the network node identifies that it is a random access procedure for a group of wireless device, also referred to as a group random access procedure. The network node then assigns a group TC-RNTI to the coordinator. The coordinator performs possible collision resolution with this TC-RNTI (there might be other wireless devices from other groups, using the same pre-amble, as coordinator). After the collision resolution, this group TC-RNTI may be promoted to a group C-RNTI.

Up to this point in time, i.e. once the network node has received the random access request and transmitted the random access response comprising the group TC-RNTI, it is only the coordinator, i.e. the first wireless device, that has been identified by the network node. The network node has no information about other wireless devices in the group that are associated with the received random access request message. The other wireless devices use the group C-RNTI, in their respective connection request messages, in order to setup their own RRC connections to the network node. Different from the existing standard procedure, these wireless devices do not need to, and shall not, transmit random access requests (pre-amble transmission), they just start to send respective connection request messages with the group C-RNTI to the network node. The connection request message will also include the identifier of the wireless device. Upon the reception of the connection request message, the network node identifies the wireless device by means of group C-RNTI together with the wireless device identifier (e.g. Temporary Mobile Subscriber Identity, TMSI). After the RRC connection setup, the wireless devices in the same group will always include the group C-RNTI and the wireless device identifier in MAC control element, in the data packet transmission. The network node then identifies the packet source, i.e. which wireless device originates the packet transmission, and forwards the data packet with the modified packet header, to e.g. a media gateway.

The connection request message may correspond to the so-called Msg3 of the RACH procedure as specified by 3GPP, see also FIG. 4d actions 450 and 475.

Figure 2D:
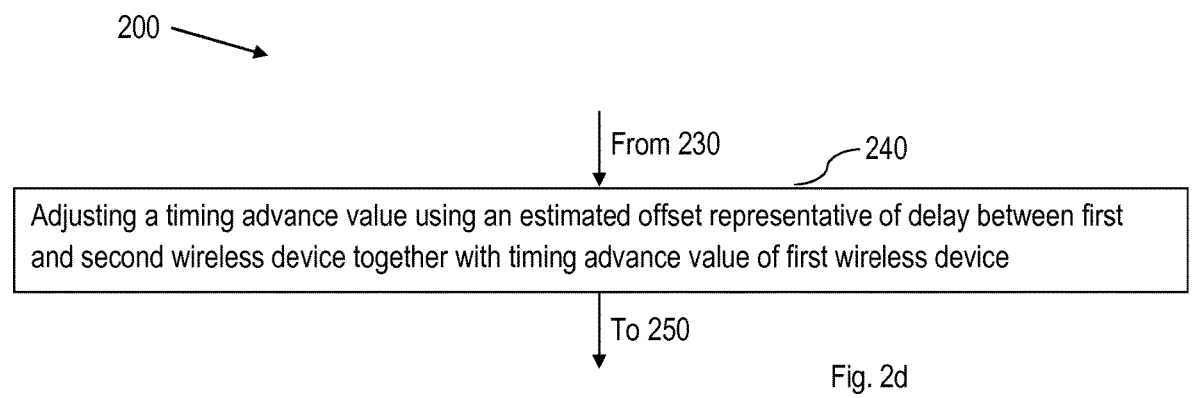
FIG. 2d is a flowchart of a method performed by a second wireless device for performing random access to a network node according to a further exemplifying embodiment.

The method may further comprise, as illustrated in FIG. 2d, adjusting 240 a timing advance value using an estimated offset representative of a delay between the first and the second wireless device together with a timing advance value of the first wireless device; wherein the transmitting 250 of the connection request message comprises transmitting the message to the network node in accordance with the adjusted timing advance value.

In order for the second wireless device to be correctly synchronised with the network node, it needs to adjust the timing advance value. As described above, there may be a plurality of wireless devices in the group and all wireless devices of the group that are not the first wireless device may be referred to as a second wireless device. Each second wireless device transmits its own connection request message to the network node including its own identifier in MAC control element. It is worth to note that the coordinator, i.e. the first wireless device, may have already received a timing advance value in random access response message from the network node. That timing advance value is suitable to the coordinator. In other words, that timing advance value is recommended by network node to compensate the propagation delay from the coordinator to network node. The other wireless devices (the other second wireless devices) in the group may use the same timing advance value as the coordinator, however, with an individual additional offset. The additional offset may be estimated/calculated depending on the distance from the coordinator to the respective other devices.

The other wireless devices use the timing advance value with the additional offset to transmit the connection request message. As soon as the network node receives the connection request message from respective wireless devices in the group for which the random access request was for, network node has a chance to adjust the timing advance value if needed when successfully receiving the connection request. The adjusted timing advance value may be sent to the respective wireless devices in a respective RRC connection setup message from the network node to the respective wireless devices.

Once the second wireless device has updated the timing advance value, the second wireless device uses the updated timing advance value for communication with the network node. One example of communication with the network node is the transmission of the connection request message. See also FIG. 4d actions 450 and 475.

In this manner, the second wireless device and the network node can be said to be synchronised with each other.

Figure 2E:
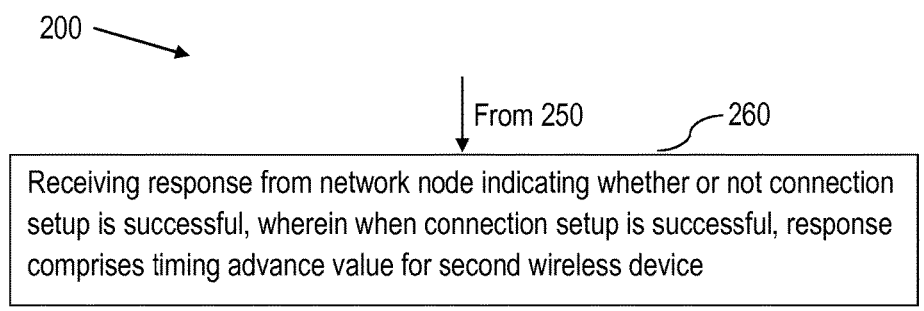
FIG. 2e is a flowchart of a method performed by a second wireless device for performing random access to a network node according to another exemplifying embodiment.

The method may further comprise, as illustrated in FIG. 2e, receiving 260 a response from the network node indicating whether or not the connection setup is successful, and wherein the response comprises a timing advance value for the second wireless device when the connection setup is successful.

It may be that the connection setup failed. If so, the second wireless device may re-transmit the connection request comprising group C-RNTI and the identifier of the wireless device.

If the connection setup is successful, the network node transmits a response, e.g. a RRC connection setup, comprising the timing advance value that is specific for the second device, see also FIG. 4d actions 455 and 480. The second wireless device should then use this received timing advance value for any subsequent communication with the network node, e.g. when sending data to the network node, see also FIG. 4d actions 460 and 485.

The response message from the network node may correspond to the so-called Msg4 of the RACH procedure as specified by 3GPP.

In an example, subsequent transmission(s) from the second wireless device to the network node comprises the group C-RNTI and its own identifier in e.g. the MAC control element.

The RRC connection setup message that is received from the network node also comprises the group C-RNTI. Consequently, after receiving connection setup message from the network node comprising the group C-RNTI, the second wireless devices henceforth includes, or uses, the group C-RNTI and its own identifier for subsequent transmission(s) from the second wireless device to the network node.

Embodiments herein also relate to a method performed by a network node for supporting a first wireless device and one or more second wireless devices requesting resources from the network node, wherein the first wireless device, the one or more second wireless devices and the network node are operable in the wireless communication network. Different embodiments of such a method will now be described with reference to FIGS. 3a-3d.

Figure 3A:
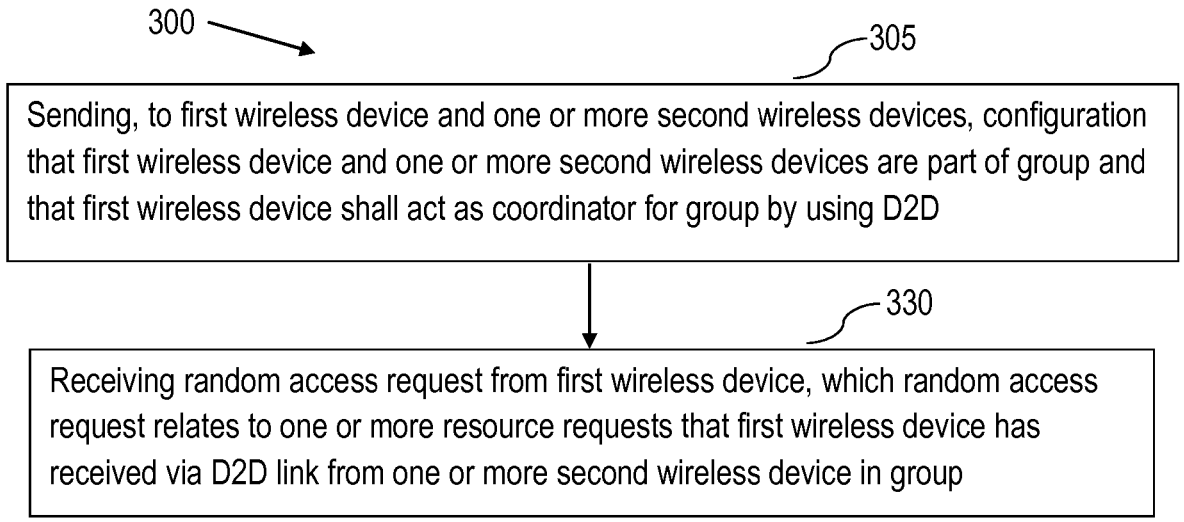
FIG. 3a is a flowchart of a method performed by a network node for supporting random access with a first wireless device acting as a coordinator for a group of wireless devices comprising the first wireless device and at least a second wireless device, according to an exemplifying embodiment.

FIG. 3a illustrates the method comprising sending 305 to the first wireless device and the one or more second wireless devices, a configuration that the first wireless device and one or more second wireless devices are part of a group, and that the first wireless device shall act as a coordinator for the group by using direct mode communication, D2D; and receiving 330 a random access request from the first wireless device, which random access request relates to one or more resource requests that the first wireless device has received via a D2D link from the one or more second wireless devices in the group.

The network node may send the configuration that the first wireless device and one or more second wireless devices are part of a group, and that the first wireless device shall act as a coordinator for the group. The configuration may be sent to all wireless devices that are part of the group. As explained above, with reference to the first and second wireless device, the wireless devices are informed that they are part of the group and which wireless device in the group is the first wireless device, i.e. is to act as coordinator for the group.

The network node may then receive the random access request from the first wireless device, which random access request relates to one or more resource requests that the first wireless device has received via a D2D link from the one or more second wireless devices in the group. In this manner, the network node is informed that one or more wireless device in the group is/are requesting resources.

The method performed by the network node has the same several possible advantages as the method by the first and second wireless device. One possible advantage is that the intensity of the random access attempts, e.g. number of random access attempts per time unit, from the group may be reduced compared to if the group members did individual random access attempts as in legacy procedure. Another possible advantage is that the intensity of the coordinated random access can be controlled by the network by setting the group size and a delay to suitable values.

Figure 3B:
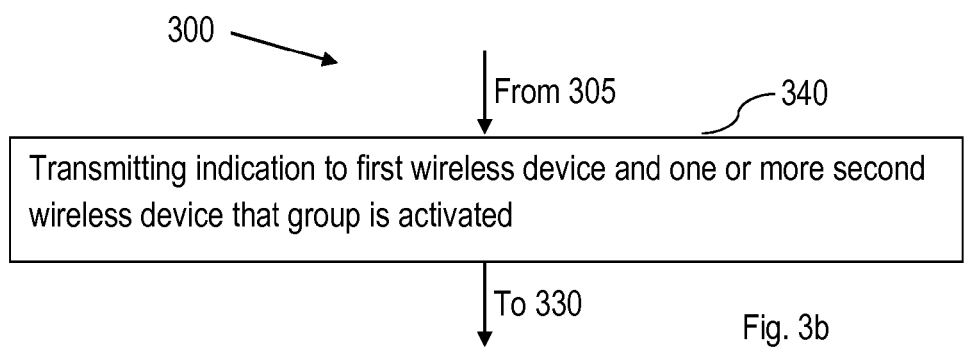
FIG. 3b is a flowchart of a method performed by a network node for supporting random access with a first wireless device acting as a coordinator for a group of wireless devices comprising the first wireless device and at least a second wireless device, according to yet an exemplifying embodiment.

The method 300 may further comprise, as illustrated in FIG. 3b, when a random access load becomes higher than a threshold, transmitting (320) an indication to the first wireless device and the one or more second wireless devices that the group is activated.

The network node may continuously, regularly or otherwise monitor the random access load. The random access load is dependent on the number of random access requests being transmitted to the network node. As there are a limited amount of preambles that are available for the random access requests, there is a risk of collision, i.e. at least two wireless devices randomly selecting the same preamble for their respective random access request. Thus, once the random access load becomes higher than a threshold, the network node activates the group of wireless devices. The threshold may in an example be a percentage of a maximum load, or a number of received random access requests per time unit. The load may for example be defined as a fraction or number of occupied preambles within a given time unit. As described above, the indication may be a separate message transmitted by the network node, incorporated in the group configuration or the group configuration itself may serve as the indication that the group is activated.

By activating the group, the wireless devices in the group except the first device are restricted to send random access requests to the network node, wherein the random access load may be reduced. Before, or when, activating the group, the network node also configures the first wireless device as the coordinator for the group of wireless devices comprising the first wireless device and at least the second wireless device. The indication may be broadcasted to all wireless devices. See also FIG. 4d action 410.

The network node thus appoints one of the wireless devices that should act as coordinator for the other wireless devices in the group, the coordinator also being referred to as the first wireless device in this disclosure. The information about which wireless device is to be the first wireless device is included in the indication. In this manner, the wireless devices in the group are informed of which wireless device is the coordinator so that they know to which wireless device to send requests for resources. It also informs all wireless devices that or not the first wireless device that they are henceforth to act as the second wireless device and should not transmit random access requests to the network node.

The network node may then receive a random access request from the first wireless device, the random access request being an aggregated request for one or more wireless devices. In this manner, the network node receives one random access request, which is associated with a one or more wireless device instead of receiving a plurality of random access requests, one from each wireless device in the group. See also FIG. 4d action 420.

Figure 3C:
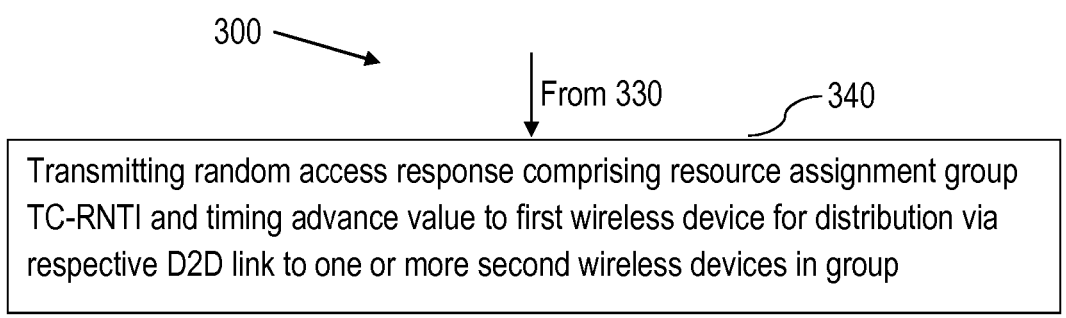
FIG. 3c is a flowchart of a method performed by a network node for supporting random access with a first wireless device acting as a coordinator for a group of wireless devices comprising the first wireless device and at least a second wireless device, according to still an exemplifying embodiment.

The method may further comprise as illustrated in FIG. 3c, transmitting 340 a random access response comprising a resource assignment, a group temporary Cell Radio Network Temporary Identity, group TC-RNTI, and timing advance value, to the first wireless device for distribution via a respective D2D link to the one or more second wireless devices in the group.

By the above described received random access request from the first wireless device, the network node has obtained information about the wireless devices that are requesting resources. Based on the obtained information, the network node may transmit the random access response comprising a resource assignment, the group TC-RNTI, and the timing advance value, to the first wireless device. See also FIG. 4d action 425.

The configuring of the first wireless device acting as a coordinator for a group of wireless devices may be based on which wireless device in the group that is associated with the best channel quality.

Any wireless device in the group may potentially or possibly act as, or be, the first wireless device. It may be that the different wireless devices may have different capabilities and/or characteristics, wherein certain wireless devices may be more suitable for acting as the first wireless device. In an example, the network node determines which wireless device in the group of wireless devices that shall be the first wireless device based on channel quality.

The wireless device being associated with the best channel quality may be most likely to successfully perform the random access to the network node.

Figure 3D:
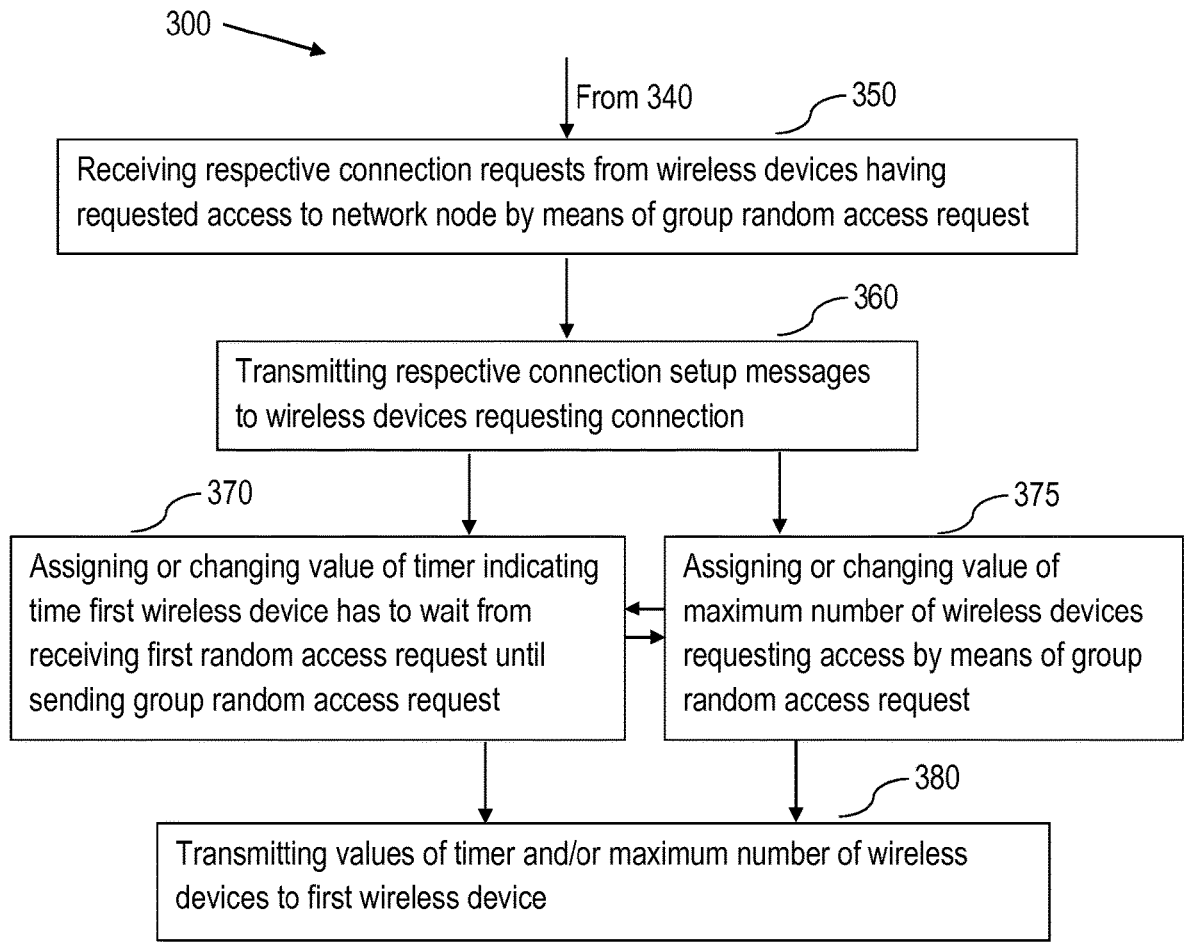
FIG. 3d is a flowchart of a method performed by a network node for supporting random access with a first wireless device acting as a coordinator for a group of wireless devices comprising the first wireless device and at least a second wireless device, according to a further exemplifying embodiment.

The method may still further comprise, as illustrated in FIG. 3d, receiving 350 respective connection requests from wireless devices having requested access; and transmitting 360 respective response messages to the wireless devices requesting connection.

In response to receiving the random access request (action 420 of FIG. 4d), the network node transmits a random access response to the first wireless device, see also FIG. 4d action 425. The random access response comprises a group TC-RNTI and a resource assignment, and a timing advance value.

As explained above, the first wireless device divides the resource assignments between the wireless devices that are requesting resources.

Consequently, then those wireless devices each may transmit a connection request message to the network node. The network node thus receives respective connection requests from wireless devices having requested access to the network node. The connection request may comprise the group C-RNTI and their own identifiers, see also FIG. 4d actions 430, 450 and 475.

The network node then transmits respective response messages to the wireless devices requesting connection, see also FIG. 4d actions 435, 455 and 480.

In an example, the respective connection request messages comprise the group C-RNTI and respective identifier of the respective wireless devices in a MAC control element.

The group of wireless devices may be identified by the group C-RNTI and each wireless device may be identified by their own identifier.

In this manner, the network node may uniquely distinguish which wireless device in which group is requesting access by the connection request messages.

In yet an example, the respective response message comprises respective timing advance value for the respective wireless device.

Depending on the distance between the network node and the respective wireless devices, it takes different times from signals to travel between the network node and the respective wireless devices.

In order for the network node and the respective wireless devices to be synchronised, each wireless device may use a specific timing advance value which is dependent on the distance to the network node. Thus, by determining respective timing advance value for the respective wireless device and including those in the respective response messages, the network node may be synchronised with each of the wireless devices in the group which are requesting connection to and resources from the network node.

In yet a further example, the random access request comprises a preamble indicating that it is a group of wireless devices and not a single wireless device requesting access to the network node.

This has been explained in detail above.

The method may further comprise assigning or changing 370 a value of a timer, indicating a time the first wireless device has to wait from receiving a first resource request until sending the random access request; and/or assigning or changing 375 a value of a maximum number of wireless devices, requesting access by means of the random access request; and transmitting 380 the value(s) of the timer and/or the counter to the first wireless device.

It may happen that the network node determines that one of the value of C_max and/or the value, T_coord_max, for when T_coord is to expire need to be updated or adjusted. If so, the network node assigns or changes the value of C_max and/or the value, T_coord_max, for when T_coord is to expire and then transmits that or those values to the first wireless device.

FIG. 4a is a graph illustrating the collision probability with "ordinary" individual random access attempts. It can be seen that with 16 preambles, the system supports about 1000 users with a collision probability of 2.5%. Using 64 preambles, approximately $10^{3.5}$ or 3200 users can be supported with a collision probability of 2.5%.

FIG. 4b is a graph illustrating the case when coordinated RACH access is used. Here it is assumed that the group is so large that a group access is done every T_coord_max second. T_coord_max is the time the first wireless device should wait from receiving a first resource request from the second wireless device until the first wireless device transmits the random access request. The T_coord_max may also be referred to as the coordination delay used before the random access. It can be seen that a T_coord, of 0.07 s is needed when 64 preambles are used in order to achieve a 2.5% collision probability. If 16 preambles are used, a T_coord of 0.25 s is needed to obtain the same collision probability, 2.5%, as in the FIG. 4a.

The advantage of the solution is that irrespective of the group size or the number of users in the system, a specific collision probability for a given T_coord is obtained. That is, even if the number of users that are supported in FIG. 4a are doubled, it is possible to maintain the random access collision probability by selecting a suitable T_coord in FIG. 4b. Hence, increasing the number of users will increase the number of users sharing a random access.

FIG. 4c is a graph illustrating the number of users sharing a group RACH access for a given T_coord for different number of users in the cell. Relating this to FIG. 4a the random access capacity increase is illustrated. For example, by using a T_coord of 0.1 s and allowing that 5 users share the same random access, the system can support 10 000 users in a cell (associated with a network node) with a random access collision probability of 2.5%. Comparing this to the 3200 users the system could support with individual random accesses it is seen that the capacity triples.

FIGS. 4a-4c illustrate the benefits and potential of the solution. Depending on the scenario and requirements, the gains may be different. To optimise the performance, the group size, T_coord_max and the number of preambles used for random access, also referred to as RACH access, may be tuned.

As can be seen, a massive amount of wireless devices, which may be e.g. MTC devices, deployed in a limited area impose a risk of random access collision due to that the number of concurrent pre-amble resource used for the random access attempt is limited (the number of the available preamble resources is counted by the total number of preambles minus the number of dedicated preambles). It should be noted that the preambles assigned for contention based random accesses may be partitioned by the network into two subgroups, i.e. one subgroup is used for the accesses with big packet size, while another one is used for the accesses with small packet size. This means that the available number of preambles for e.g. MTC devices may be much less than the total number. If the random access attempt fails, the device has to perform retransmission of the random access attempt by increasing the transmission power. If random access does not succeed until a given number of attempts, the wireless device has to perform a back-off and select another preamble to continue. This doesn't reduce the collision probability when a high number of devices are accessing the cell in parallel, since it inevitably increases the number of concurrent random access attempts and causes higher interference to other on-going data transmissions due to the high transmission power. Another negative impact of the increased number of random access attempts is the increased access delay which hurts the user quality of experience. All these drawbacks may be overcome by the embodiments of the solution described herein.

By grouping the wireless devices and having one wireless device (referred to as the first wireless device in this disclosure) acting as coordinator for the group, wherein wireless devices in the group go via the coordinator to request resources, the number of random access attempts may be reduced. The wireless devices in the group are able to communicate directly, e.g. by means of D2D communication. At least the wireless devices in the group may communicate with the first wireless devices directly. The coordinator may delay all random attempts from the group during a time period and may thereby receive several requests for resources from devices in the group. The coordinator sends the random access request to the network node which may be composed of the aggregated information of the active devices (the devices that wants to make a random access attempt during the period).

The transmission of random access requests and the contention resolution may be applicable to a Random Access Channel, RACH, but also to control channels such as the PDCCH and the PUCCH.

The wireless devices are assumed to be located relatively close to each other in order for them to be able to communicate directly. Further, the network node may be able to form the group of wireless device, wherein the network node may activate the group e.g. when the RACH load is deemed too high for the network node (e.g. an eNodeB) to handle. The group configuration including group identifier, identifiers of group members, keys for group authentication and data transmission integrity etc., may be pre-configured and stored at the device memory or informed by the network node to the devices in the group which have already been connected to the network node. There should be at least one device in the group which has already successfully established an RRC connection to the wireless network.

FIG. 4d is an exemplifying signalling diagram of three wireless devices requesting resources from a network node. In this illustrative example, "Device C" is the first wireless device and thus acts as coordinator for the group of wireless devices. "Device A" and "Device B" are both members of the group and are both a second wireless device.

When the load on the RACH becomes too high, the network node may activate the group, action 410. The network node selects one of the group members, for example the wireless device which has the best channel quality with regards to channels between respective wireless devices and the network node as the group coordinator. If the network node does not have any recent quality measurement (for example Reference Signal Received Power, RSRP), it may just pick one of the wireless devices in the group randomly. If the quality measurement of the coordinator suddenly becomes too low, the network node may at any time select another wireless device in the group as coordinator.

The wireless devices communicate between themselves by means of D2D communication. The D2D communication could use resource assigned by the network node if the wireless devices in the group already has an RRC connection to the network node, or choose the resource from a common resource pool that may be preconfigured for D2D communications. The resource assigned by the network refers to resource(s) allocated in the frequency domain and the time domain, e.g. Physical Uplink Shared Channel, PUSCH, resource(s).

If the group is active, each wireless device in the group that has data to transmit and wishes to make a random access request may send a resource request comprising its BSR via D2D to the coordinator, action 415. Hence, the group coordinator, Device C, can understand which wireless device(s) desires the resources. The coordinator delays all RACH attempts during a short time period T_coord_max and may thereby receive several D2D resource requests from wireless devices in the group, up to the MaxNoOfAttempts, C_max, (the maximum number of active wireless devices that wants to make a group RACH access). If the number of devices increases in the cell, the network node may either increase the T_coord_max or MaxNoOfAttempts, C_max, specifically for each group. The group coordinator randomly selects the preamble from the preamble partition allocated for group accesses and transmits to the network node, action 420. Upon the reception of the group preamble, the network node (i.e. eNB in this example) understands that it is requesting resource for a group.

The coordinator's random access request is composed of the aggregated information of the wireless devices (such as the number of devices who have data to send and the aggregated BSR) that request resources during this time period T_coord_max.

The network node includes the resource assignment of the PUSCH channel for the group in the message 2 (RACH access response), action 425. The network node might know the exact number of the wireless devices in the group who are requesting resources. Consequently, the network node could assign the resources for the group considering a given number of wireless devices. This number may be preconfigured or changed dynamically depending on the group data activities.

The resource assignments for the group could have the same position in time domain, so that all active wireless devices may transmit using different Physical Resource Block, PRB, regions in the same Transmission Time Interval, TTI. Since the network node might know the number of wireless devices, it may give sufficient resources for the different wireless devices.

Upon the reception of the message 2 (i.e. the RACH response), the group coordinator (i.e. Device C) relays/splits the resource assignments within the group, actions 430, 445 and 470. The resource allocation order is exchanged 445 and 470 between the coordinator and the neighbour wireless devices using D2D links. In case the resource assignments are not adequate for all active devices, some devices (e.g. with low priority order) may wait until next group RACH access opportunity.

Embodiments herein also relate to a first wireless device for requesting resources from a network node, wherein the first wireless device, one or more second wireless devices and the network node are operable in a wireless communication network. The first wireless device has the same technical features, objects and advantages as the method performed by the first wireless device.

The first wireless device will be described with reference to FIGS. 5 and 6. Both FIG. 5 and FIG. 6 are block diagram of embodiments of the first wireless device.

Figure 5:
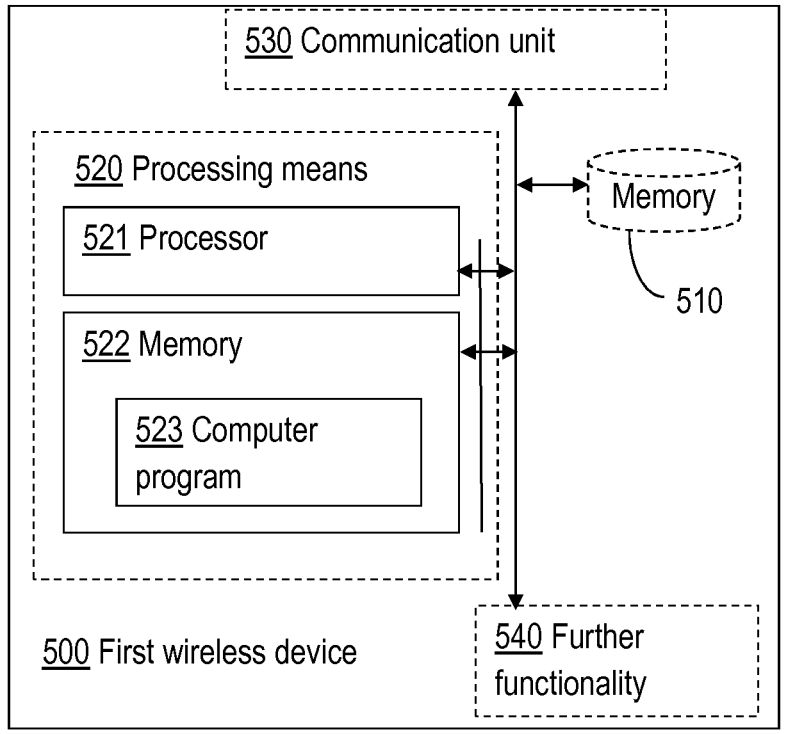
FIG. 5 is a block diagram of a first wireless device for performing random access to a network node according to an exemplifying embodiment.
Figure 6:
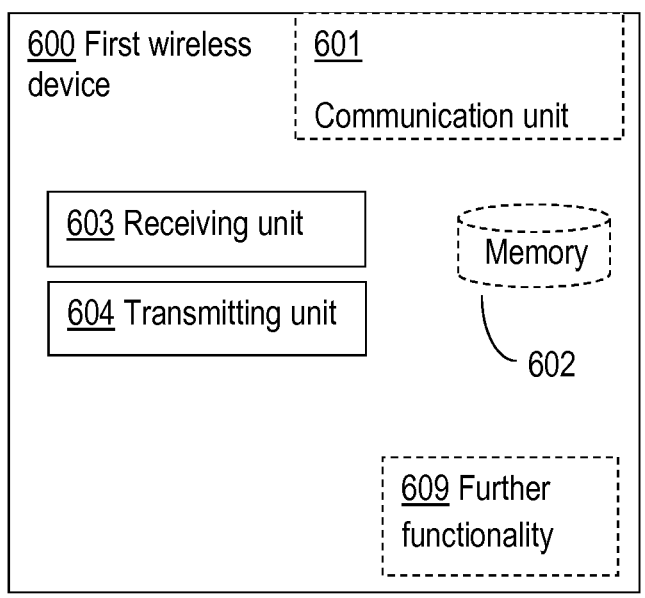
FIG. 6 is a block diagram of a first wireless device for performing random access to a network node according to another exemplifying embodiment.

FIGS. 5 and 6 illustrate the first wireless device 500, 600 being configured for receiving, from the network node, a configuration that the first wireless device and one or more second wireless devices are part of a group, and that the first wireless device shall act as a coordinator for the group, wherein wireless devices in the group are capable of D2D; and for receiving one or more resource requests from respective one or more second wireless devices in the group, wherein each one of the resource requests are received over a D2D link, between the first wireless device and the respective one or more second wireless devices. The first wireless device 500, 600 is further configured for transmitting a random access request to the network node, which random access request relates to requested resources according to the received one or more resource requests from the group.

The first wireless device 500, 600 may be realised or implemented in various different ways. A first exemplifying implementation or realisation is illustrated in FIG. 5. FIG. 5 illustrates the first wireless device 500 comprising a processor 521 and memory 522, the memory comprising instructions, e.g. by means of a computer program 523, which when executed by the processor 521 causes the first wireless device 500 to receive, from the network node, a configuration that the first wireless device and one or more second wireless devices are part of a group, and that the first wireless device shall act as a coordinator for the group, wherein wireless devices in the group are capable of D2D; and to receive one or more resource requests from respective one or more second wireless devices in the group, wherein each one of the resource requests are received over a D2D link, between the first wireless device and the respective one or more second wireless devices. The memory further comprises instructions, which when executed by the processor 521 causes the first wireless device 500 to transmit a random access request to the network node, which random access request relates to requested resources according to the received one or more resource requests from the group.

FIG. 5 further illustrates the first wireless device 500 comprising a memory 510. It is pointed out that FIG. 5 is merely an exemplifying illustration and memory 510 may be optional, be a part of the memory 522 or be a further memory of the first wireless device 500. The memory may for example comprise information relating to the first wireless device 500, to statistics of operation of the first wireless device 300. FIG. 5 further illustrates the first wireless device 500 comprising processing means 520, which comprises the memory 522 and the processor 521. Still further, FIG. 5 illustrates the first wireless device 500 comprising a communication unit 530. The communication unit 530 may comprise an interface through which the first wireless device 500 communicates with other nodes or entities of the communication network as well as other communication units. FIG. 5 also illustrates the first wireless device 500 comprising further functionality 540. The further functionality 540 may comprise hardware of software necessary for the first wireless device 500 to perform different tasks that are not disclosed herein.

An alternative exemplifying implementation of the first wireless device 500, 600 is illustrated in FIG. 6. FIG. 6 illustrates the first wireless device 600 comprising a receiving unit 603 for receiving, from the network node, a configuration that the first wireless device and one or more second wireless devices are part of a group, and that the first wireless device shall act as a coordinator for the group, wherein wireless devices in the group are capable of D2D; and for receiving one or more resource requests from respective one or more second wireless devices in the group, wherein each one of the resource requests are received over a D2D link, between the first wireless device and the respective one or more second wireless devices. The first wireless device 600 further comprises a transmitting unit 604 for transmitting a random access request to the network node, which random access request relates to requested resources according to the received one or more resource requests from the group.

FIG. 6 illustrates the first wireless device 600 further comprising a communication unit 601. Through this unit, the first wireless device 600 is adapted to communicate with other nodes and/or entities in the wireless communication network. The communication unit 601 may comprise more than one receiving arrangement. For example, the communication unit 601 may be connected to an antenna, by means of which the first wireless device 600 is enabled to communicate with other nodes and/or entities in the wireless communication network. Similarly, the communication unit 601 may comprise more than one transmitting arrangement, which in turn is connected to both a wire and an antenna, by means of which the first wireless device 600 is enabled to communicate with other nodes and/or entities in the wireless communication network. The first wireless device 600 is further illustrated comprising a memory 602 for storing data. Further, the first wireless device 600 may comprise a control or processing unit (not shown) which in turn is connected to the different units 603-604. It shall be pointed out that this is merely an illustrative example and the first wireless device 600 may comprise more, less or other units or modules which execute the functions of the first wireless device 600 in the same manner as the units illustrated in FIG. 6.

It should be noted that FIG. 6 merely illustrates various functional units in the first wireless device 600 in a logical sense. The functions in practice may be implemented using any suitable software and hardware means/circuits etc. Thus, the embodiments are generally not limited to the shown structures of the first wireless device 600 and the functional units. Hence, the previously described exemplary embodiments may be realised in many ways. For example, one embodiment includes a computer-readable medium having instructions stored thereon that are executable by the control or processing unit for executing the method steps in the first wireless device 600. The instructions executable by the computing system and stored on the computer-readable medium perform the method steps of the first wireless device 600 as set forth in the claims.

The first wireless device 500, 600 has the same possible advantages as the method 100 performed by the first wireless device.

According to an embodiment, the first wireless device 500, 600 is configured for receiving an indication from the network node indicating that the group is active.

According to yet an embodiment, the random access request comprises aggregated resource requests from the one or more second wireless devices that have data to transmit.

According to still an embodiment, the respective resource request from the one or more second wireless devices in the group comprises a BSR, and the first wireless device is configured for reporting the aggregated BSR to the network node during the random access request procedure.

According to a further embodiment, the random access request uses a random access preamble indicating that the random access request is a random access request for a group of wireless devices.

According to another embodiment, the first wireless device is configured for starting a timer when receiving a first resource request from a second wireless device in the group for which the first wireless device acts as a coordinator after a reset of the timer, and for postponing the transmitting of the random access request until the timer expires.

According to yet an embodiment, the first wireless device is configured for stopping the timer once it expires and/or the random access request is transmitted to the network node.

According to still an embodiment, the first wireless device is configured for incrementing a counter indicative of a number of received resource requests from respective one or more second wireless devices in the group and for postponing the transmitting of the random access request until the counter has reached a maximum value of received resource requests to be aggregated into the random access request.

According to another embodiment, the first wireless device is configured for setting the counter to zero when the maximum number of resource requests is reached, and when the random access request is transmitted to the network node.

According to yet an embodiment, the first wireless device is configured for receiving, from the network node, a random access response comprising a resource assignment and a group temporary Cell Radio Network Temporary Identity, group TC-RNTI, and for dividing the resources between the wireless devices associated with the transmitted random access request by transmitting, via respective D2D link, a respective resource allocation message comprising the group RNTI to the respective wireless devices associated with the random access request.

According to an embodiment, the first wireless device is configured for transmitting a connection request message to the network node, the connection request comprising a group TC-RNTI and an identifier of the first wireless device in a Media Access Control, MAC, control element; and for receiving a response from the network node indicating whether or not the connection setup is successful, wherein the group TC-RNTI is promoted to group C-RNTI if the connection setup is successful, wherein the received response also comprises a timing advance value for the first wireless device.

Embodiments herein also relate to a second wireless device for requesting resources from a network node, wherein a first wireless device, the second wireless device and a network node are operable in the wireless communication network. The second wireless device has the same technical features, objects and advantages as the method performed by the second wireless device. The second wireless device will only be described in brief in order to avoid unnecessary repetition.

The second wireless device will be described with reference to FIGS. 7 and 8. Both FIG. 7 and FIG. 8 are block diagrams of embodiments of the second wireless device for requesting resources from a network node.

Figure 7:
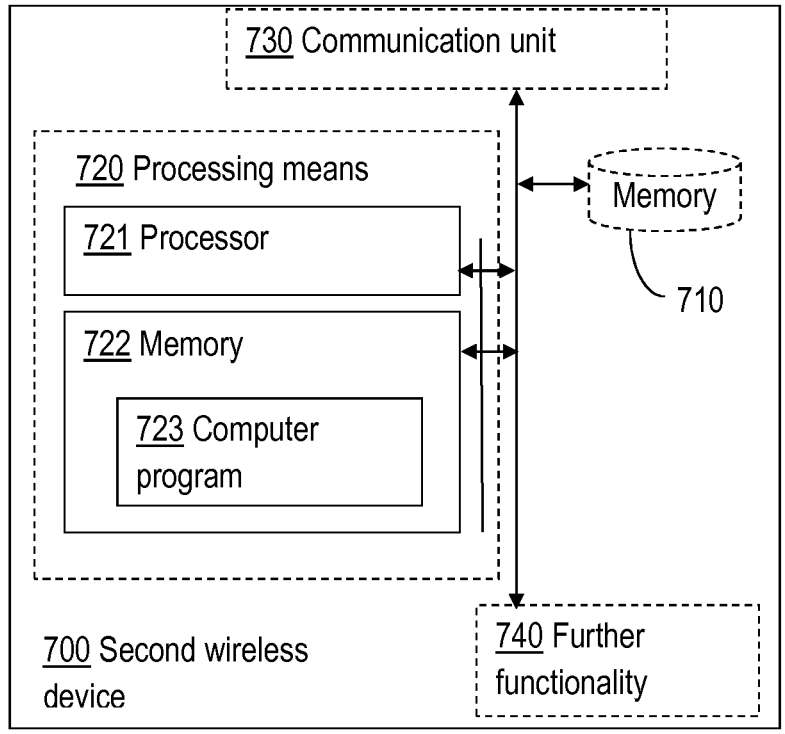
FIG. 7 is a block diagram of a second wireless device for performing random access to a network node according to an exemplifying embodiment.
Figure 8:
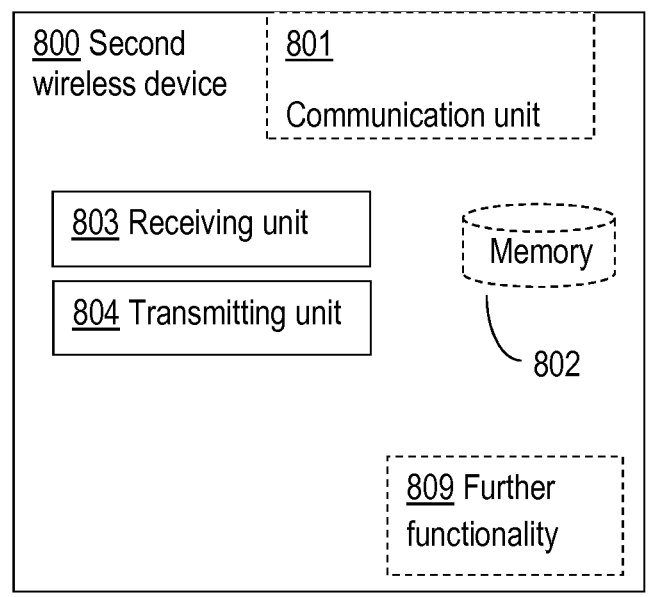
FIG. 8 is a block diagram of a second wireless device for performing random access to a network node according to another exemplifying embodiment.

FIGS. 7 and 8 illustrate the second wireless device 700, 800 being configured for receiving, from the network node, a configuration that the first wireless device and the second wireless device are part of a group, and that the first wireless device shall act as a coordinator for the group, wherein wireless devices in the group are capable of D2D. The second wireless device 700, 800 is further configured for requesting resources from the network node by transmitting over a D2D link, a resource request to the first wireless device, for being forwarded in a random access request to the network node together with any resource requests from respective one or more other second wireless devises in the group.

The second wireless device 700, 800 may be realised or implemented in various different ways. A first exemplifying implementation or realisation is illustrated in FIG. 7. FIG. 7 illustrates the second wireless device 700 comprising a processor 721 and memory 722, the memory comprising instructions, e.g. by means of a computer program 723, which when executed by the processor 721 causes the second wireless device 700 to receive, from the network node, a configuration that the first wireless device and the second wireless device are part of a group, and that the first wireless device shall act as a coordinator for the group, wherein wireless devices in the group are capable of D2D. The memory further comprises instructions, which when executed by the processor 721 causes the second wireless device 700 to request resources from the network node by transmitting over a D2D link, a resource request to the first wireless device, for being forwarded in a random access request to the network node together with any resource requests from respective one or more other second wireless devises in the group.

FIG. 7 also illustrates the second wireless device 700 comprising a memory 710. It shall be pointed out that FIG. 7 is merely an exemplifying illustration and memory 710 may be optional, be a part of the memory 722 or be a further memory of the second wireless device 700. The memory may for example comprise information relating to the second wireless device 700, to statistics of operation of the second wireless device 700, just to give a couple of illustrating examples. FIG. 7 further illustrates the second wireless device 700 comprising processing means 720, which comprises the memory 722 and the processor 721. Still further, FIG. 7 illustrates the second wireless device 700 comprising a communication unit 730. The communication unit 730 may comprise an interface through which the second wireless device 700 communicates with other nodes or entities of the communication network as well as other communication units. FIG. 7 also illustrates the second wireless device 700 comprising further functionality 740. The further functionality 740 may comprise hardware of software necessary for the second wireless device 700 to perform different tasks that are not disclosed herein.

An alternative exemplifying implementation of the second wireless device 700, 800 is illustrated in FIG. 8. FIG. 8 illustrates the second wireless device 800 comprising a receiving unit 803 for receiving, from the network node, a configuration that the first wireless device and the second wireless device are part of a group, and that the first wireless device shall act as a coordinator for the group, wherein wireless devices in the group are capable of D2D; and a transmitting unit 804 for requesting resources from the network node by transmitting over a D2D link, a resource request to the first wireless device, for being forwarded in a random access request to the network node together with any resource requests from respective one or more other second wireless devises in the group.

In FIG. 8, the second wireless device 800 is also illustrated comprising a communication unit 801. Through this unit, the second wireless device 800 is adapted to communicate with other nodes and/or entities in the wireless communication network. The communication unit 801 may comprise more than one receiving arrangement. For example, the communication unit 801 may be connected to both a wire and an antenna, by means of which the second wireless device 800 is enabled to communicate with other nodes and/or entities in the wireless communication network. Similarly, the communication unit 801 may comprise more than one transmitting arrangement, which in turn is connected to both a wire and an antenna, by means of which the second wireless device 800 is enabled to communicate with other nodes and/or entities in the wireless communication network. The second wireless device 800 is further illustrated comprising a memory 802 for storing data. Further, the second wireless device 800 may comprise a control or processing unit (not shown) which in turn is connected to the different units 803-804. It shall be pointed out that this is merely an illustrative example and the second wireless device 800 may comprise more, less or other units or modules which execute the functions of the second wireless device 800 in the same manner as the units illustrated in FIG. 8.

It should be noted that FIG. 8 merely illustrates various functional units in the second wireless device 800 in a logical sense. The functions in practice may be implemented using any suitable software and hardware means/circuits etc. Thus, the embodiments are generally not limited to the shown structures of the second wireless device 800 and the functional units. Hence, the previously described exemplary embodiments may be realised in many ways. For example, one embodiment includes a computer-readable medium having instructions stored thereon that are executable by the control or processing unit for executing the method steps in the second wireless device 800. The instructions executable by the computing system and stored on the computer-readable medium perform the method steps of the second wireless device 800 as set forth in the claims.

The second wireless device 700, 800 has the same possible advantages as the method performed by the second wireless device.

According to an embodiment, the second wireless device 700, 800 is configured for receiving an indication from the network node, indicating that the group is active.

According to yet an embodiment, the second wireless device 700, 800 is configured for receiving a resource allocation, via a D2D link from the first wireless device, comprising a group C-RNTI; and for transmitting a connection request message to the network node, the connection request comprising the group C-RNTI and an identifier of the second wireless device in a MAC control element.

According to still an embodiment, the second wireless device 700, 800 is configured for adjusting a timing advance value using an estimated an offset representative of a delay between the first and the second wireless device together with a timing advance value of the first wireless device, wherein the transmitting of the connection request message comprises transmitting the message to the network node in accordance with the adjusted timing advance value.

According to a further embodiment, the second wireless device 700, 800 is configured for receiving a response from the network node indicating whether or not the connection setup is successful, and wherein the response comprises a timing advance value for the second wireless device when the connection setup is successful.

According to another embodiment, subsequent transmission(s) from the second wireless device to the network node comprises the group C-RNTI and its own identifier in the MAC control element.

Embodiments herein also relate to a network node for supporting a first wireless device and one or more second wireless devices requesting resources from the network node, wherein the first wireless device, the one or more second wireless devices and the network node are operable in the wireless communication network. The network node has the same technical features, objects and advantages as the method performed by the network node. The network node will only be described in brief in order to avoid unnecessary repetition.

The network node will be described with reference to FIGS. 9 and 10. Both FIG. 9 and FIG. 10 are block diagrams of embodiments of the network node for supporting random access with a first wireless device acting as a coordinator for a group of wireless devices comprising the first wireless device and at least a second wireless device.

Figure 9:
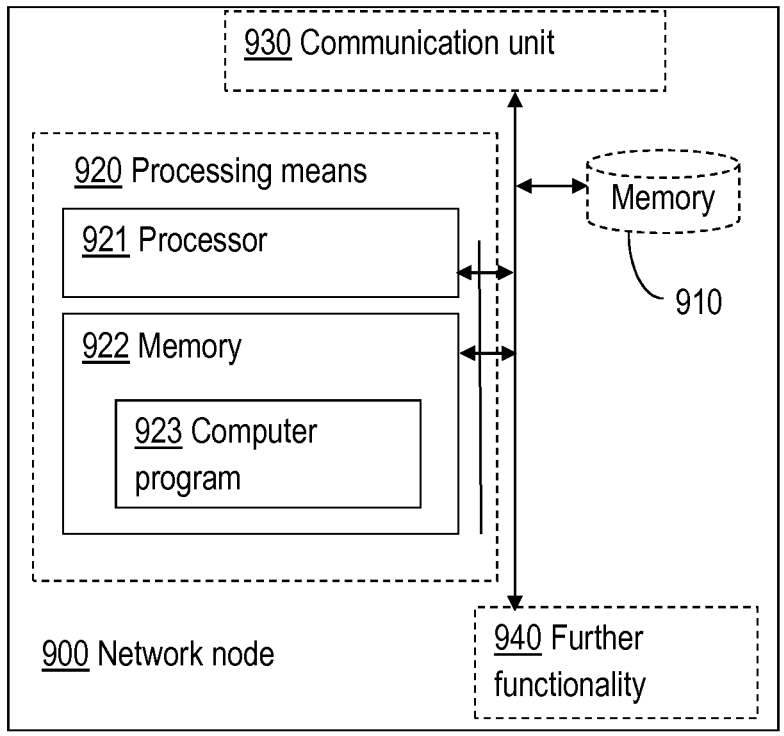
FIG. 9 is a block diagram of a network node for supporting random access with a first wireless device acting as a coordinator for a group of wireless devices comprising the first wireless device and at least a second wireless device, according to an exemplifying embodiment.
Figure 10:
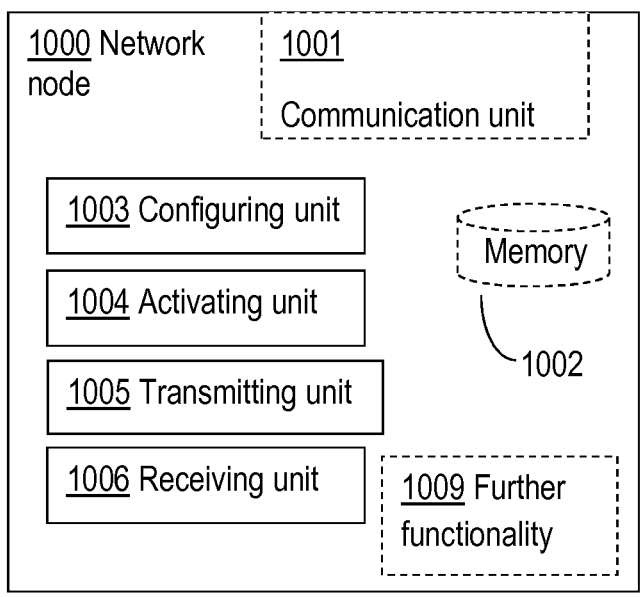
FIG. 10 is a block diagram of a network node for supporting random access with a first wireless device acting as a coordinator for a group of wireless devices comprising the first wireless device and at least a second wireless device, according to another exemplifying embodiment.

FIGS. 9 and 10 illustrate the network node 900, 1000 being configured for sending to the first wireless device and the one or more second wireless devices, a configuration that the first wireless device and one or more second wireless devices are part of a group, and that the first wireless device shall act as a coordinator for the group by using D2D; and for receiving a random access request from the first wireless device, which random access request relates to one or more resource requests that the first wireless device has received via a D2D link from the one or more second wireless devices in the group.

The network node 900, 1000 may be realised or implemented in various different ways. A first exemplifying implementation or realisation is illustrated in FIG. 9. FIG. 9 illustrates the network node 900 comprising a processor 921 and memory 922, the memory comprising instructions, e.g. by means of a computer program 923, which when executed by the processor 921 causes the network node 900 to send, to the first wireless device and the one or more second wireless devices, a configuration that the first wireless device and one or more second wireless devices are part of a group, and that the first wireless device shall act as a coordinator for the group by using D2D; and to receive a random access request from the first wireless device, which random access request relates to one or more resource requests that the first wireless device has received via a D2D link from the one or more second wireless devices in the group.

FIG. 9 also illustrates the network node 900 comprising a memory 910. It shall be pointed out that FIG. 9 is merely an exemplifying illustration and memory 910 may be optional, be a part of the memory 922 or be a further memory of the network node 900. The memory may for example comprise information relating to the network node 900, to statistics of operation of the network node 900, just to give a couple of illustrating examples. FIG. 9 further illustrates the network node 900 comprising processing means 920, which comprises the memory 922 and the processor 921. Still further, FIG. 9 illustrates the network node 900 comprising a communication unit 930. The communication unit 930 may comprise an interface through which the network node 900 communicates with other nodes or entities of the communication network as well as other communication units. FIG. 9 also illustrates the network node 900 comprising further functionality 940. The further functionality 940 may comprise hardware of software necessary for the network node 900 to perform different tasks that are not disclosed herein.

An alternative exemplifying implementation of the network node 900, 1000 is illustrated in FIG. 10. FIG. 10 illustrates the network node 1000 comprising a sending unit 1003 for sending to the first wireless device and the one or more second wireless devices, a configuration that the first wireless device and one or more second wireless devices are part of a group, and that the first wireless device shall act as a coordinator for the group by using D2D. FIG. 10 also illustrates the network node 1000 comprising a receiving unit 1006 for receiving a random access request from the first wireless device, which random access request relates to one or more resource requests that the first wireless device has received via a D2D link from the one or more second wireless devices in the group.

In FIG. 10, the network node 1000 is also illustrated comprising a communication unit 1001. Through this unit, the network node 1000 is adapted to communicate with other nodes and/or entities in the wireless communication network. The communication unit 1001 may comprise more than one receiving arrangement. For example, the communication unit 1001 may be connected an antenna, by means of which the network node 1000 is enabled to communicate with other nodes and/or entities in the wireless communication network. Similarly, the communication unit 1001 may comprise more than one transmitting arrangement, which in turn is connected to both a wire and an antenna, by means of which the network node 1000 is enabled to communicate with other nodes and/or entities in the wireless communication network. The network node 1000 is further illustrated comprising a memory 1002 for storing data. Further, the network node 1000 may comprise a control or processing unit (not shown) which in turn is connected to the different units 1003-1004. It shall be pointed out that this is merely an illustrative example and the network node 1000 may comprise more, less or other units or modules which execute the functions of the network node 1000 in the same manner as the units illustrated in FIG. 10.

It should be noted that FIG. 10 merely illustrates various functional units in the network node 1000 in a logical sense. The functions in practice may be implemented using any suitable software and hardware means/circuits etc. Thus, the embodiments are generally not limited to the shown structures of the network node 1000 and the functional units. Hence, the previously described exemplary embodiments may be realised in many ways. For example, one embodiment includes a computer-readable medium having instructions stored thereon that are executable by the control or processing unit for executing the method steps in the network node 1000. The instructions executable by the computing system and stored on the computer-readable medium perform the method steps of the network node 1000 as set forth in the claims.

The network node 900, 1000 has the same possible advantages as the method performed by network node.

According to an embodiment, the network node 900, 1000 is configured for, when a random access load becomes higher than a threshold, transmitting an indication to the first wireless device and the one or more second wireless devices that the group is activated.

According to yet an embodiment, the network node 900, 1000 is configured for transmitting a random access response comprising a resource assignment, a group TC-RNTI, and timing advance value, to the first wireless device for distribution via a respective D2D link to the one or more second wireless devices in the group.

According to still an embodiment, the configuration of the first wireless device acting as a coordinator for the group of wireless devices is based on which wireless device in the group that is associated with the best channel quality According to another embodiment, the network node 900, 1000 is configured for receiving respective connection requests from wireless devices having requested access to the network node by means of the random access request, and for transmitting respective response message to the wireless devices requesting connection.

According to yet an embodiment, the respective connection request messages comprise the group C-RNTI and respective identifier of the respective wireless devices in a MAC control element.

According to a further embodiment, the respective response message comprises respective timing advance value for the respective wireless device.

According to still an embodiment, the random access request comprises a preamble indicating that it is a group of wireless devices and not a single wireless device requesting access to the network node.

According to another embodiment, the network node 900, 1000 is configured for assigning or changing a value of a timer, indicating a time the first wireless device has to wait from receiving a first resource request until sending the random access request; and/or assigning or changing a value of a maximum number of wireless devices, requesting access by means of the random access request; and for transmitting the value(s) of the timer and/or the counter to the first wireless device.

Figure 11:
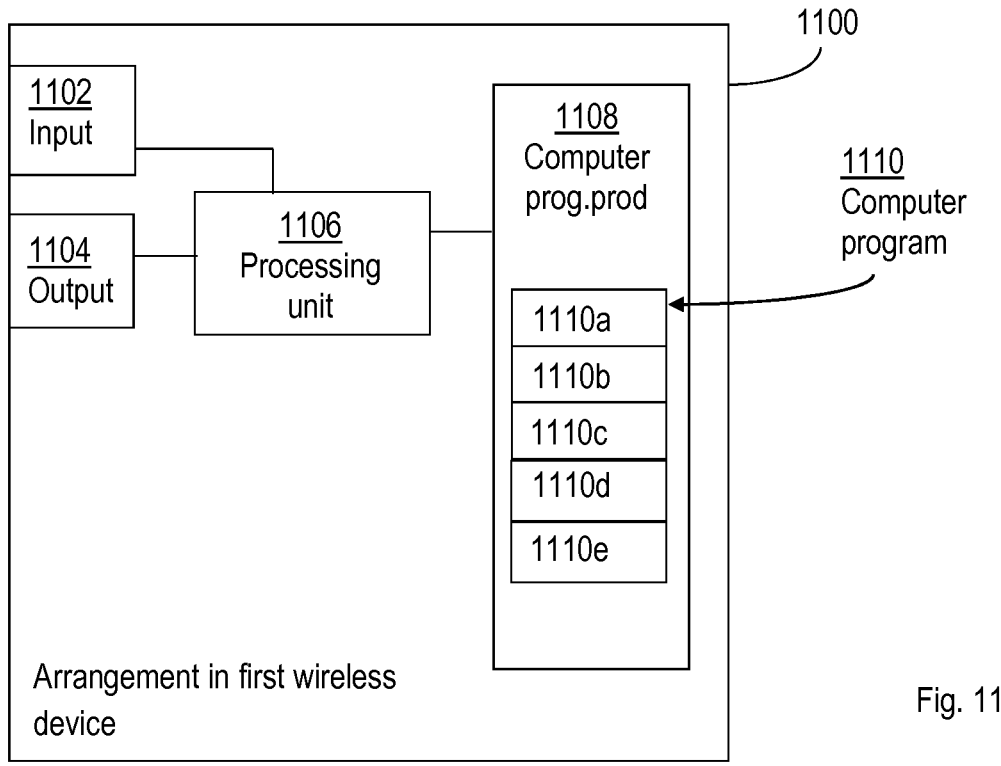
FIG. 11 is a block diagram of an arrangement in a first wireless device for performing random access to a network node according to an exemplifying embodiment.

FIG. 11 schematically shows an embodiment of an arrangement 1100 in a first wireless device 600. Comprised in the arrangement 1100 in the first wireless device 600 are here a processing unit 1106, e.g. with a Digital Signal Processor, DSP. The processing unit 1106 may be a single unit or a plurality of units to perform different actions of procedures described herein. The arrangement 1100 of the first wireless device 600 may also comprise an input unit 1102 for receiving signals from other entities, and an output unit 1104 for providing signal(s) to other entities. The input unit and the output unit may be arranged as an integrated entity or as illustrated in the example of FIG. 6, as one or more interfaces 601.

Furthermore, the arrangement 1100 in the first wireless device 600 comprises at least one computer program product 1108 in the form of a non-volatile memory, e.g. an Electrically Erasable Programmable Read-Only Memory, EEPROM, a flash memory and a hard drive. The computer program product 1108 comprises a computer program 1110, which comprises code means, which when executed in the processing unit 1106 in the arrangement 1100 in the first wireless device 600 causes the first wireless device to perform the actions e.g. of the procedure described earlier in conjunction with FIGS. 1a-1d.

The computer program 1110 may be configured as a computer program code structured in computer program modules 1110a-1110e. Hence, in an exemplifying embodiment, the code means in the computer program of the arrangement 1100 in the first wireless device 600 comprises a receiving unit, or module, for receiving, from the network node, a configuration that the first wireless device and one or more second wireless devices are part of a group, and that the first wireless device shall act as a coordinator for the group, wherein wireless devices in the group are capable of D2D; and for receiving one or more resource requests from respective one or more second wireless devices in the group, wherein each one of the resource requests are received over a D2D link, between the first wireless device and the respective one or more second wireless devices. The computer program further comprises a transmitting unit, or module, for comprises transmitting a random access request to the network node, which random access request relates to requested resources according to the received one or more resource requests from the group.

The computer program modules could essentially perform the actions of the flow illustrated in FIGS. 1a-1d, to emulate the first wireless device 600. In other words, when the different computer program modules are executed in the processing unit 1106, they may correspond to the units 603-604 of FIG. 6.

Figure 12:
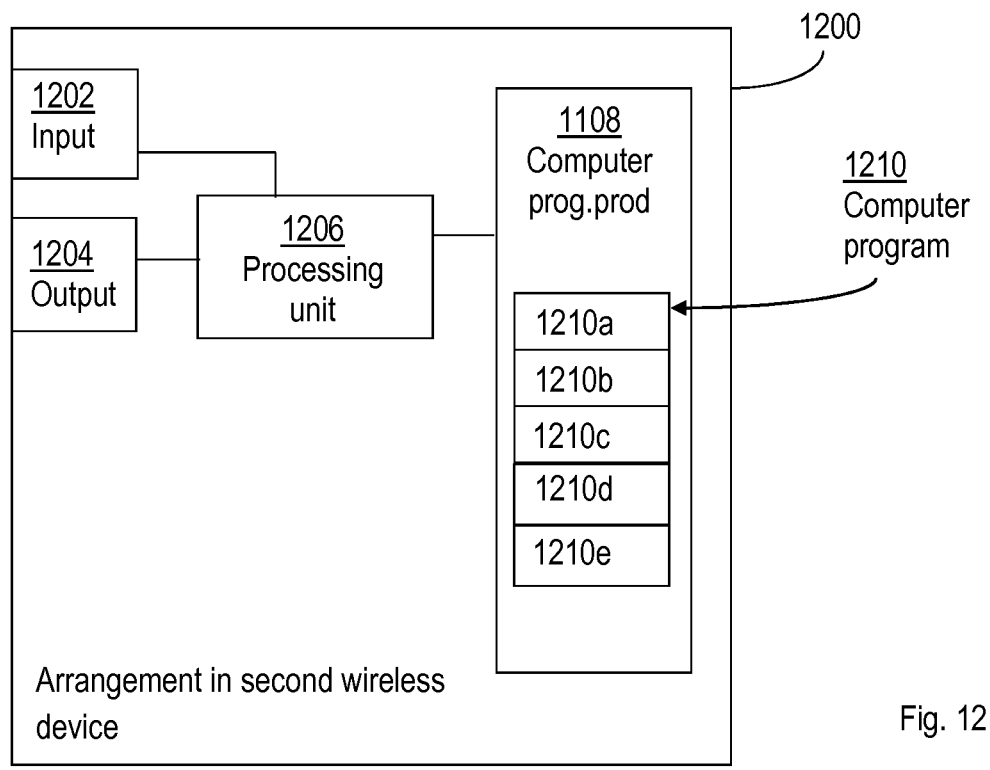
FIG. 12 is a block diagram of an arrangement in a second wireless device for performing random access to a network node according to an exemplifying embodiment.

FIG. 12 schematically shows an embodiment of an arrangement 1200 in a second wireless device 800. Comprised in the arrangement 1200 in the second wireless device 800 are here a processing unit 1206, e.g. with DSP. The processing unit 1206 may be a single unit or a plurality of units to perform different actions of procedures described herein. The arrangement 1200 of the second wireless device 800 may also comprise an input unit 1202 for receiving signals from other entities, and an output unit 1204 for providing signal(s) to other entities. The input unit and the output unit may be arranged as an integrated entity or as illustrated in the example of FIG. 8, as one or more interfaces 801.

Furthermore, the arrangement 1200 in the second wireless device 800 comprises at least one computer program product 1208 in the form of a non-volatile memory, e.g. an EEPROM, a flash memory and a hard drive. The computer program product 1208 comprises a computer program 1210, which comprises code means, which when executed in the processing unit 1206 in the arrangement 1200 in the second wireless device 800 causes the second wireless device to perform the actions e.g. of the procedure described earlier in conjunction with FIGS. 2a-2b.

The computer program 1210 may be configured as a computer program code structured in computer program modules 1210a-1210e. Hence, in an exemplifying embodiment, the code means in the computer program of the arrangement 1200 in the second wireless device 800 comprises a receiving unit, or module, for receiving from the network node, a configuration that the first wireless device and the second wireless device are part of a group, and that the first wireless device shall act as a coordinator for the group, wherein wireless devices in the group are capable of direct mode communication, D2D. The computer program further comprises a requesting unit, or module, for requesting resources from the network node by transmitting (220) over a D2D link, a resource request to the first wireless device, for being forwarded in a random access request to the network node together with any resource requests from respective one or more other second wireless devises in the group.

The computer program modules could essentially perform the actions of the flow illustrated in FIGS. 2a-2b, to emulate the second wireless device 800. In other words, when the different computer program modules are executed in the processing unit 1206, they may correspond to the units 803-804 of FIG. 8.

Figure 13:
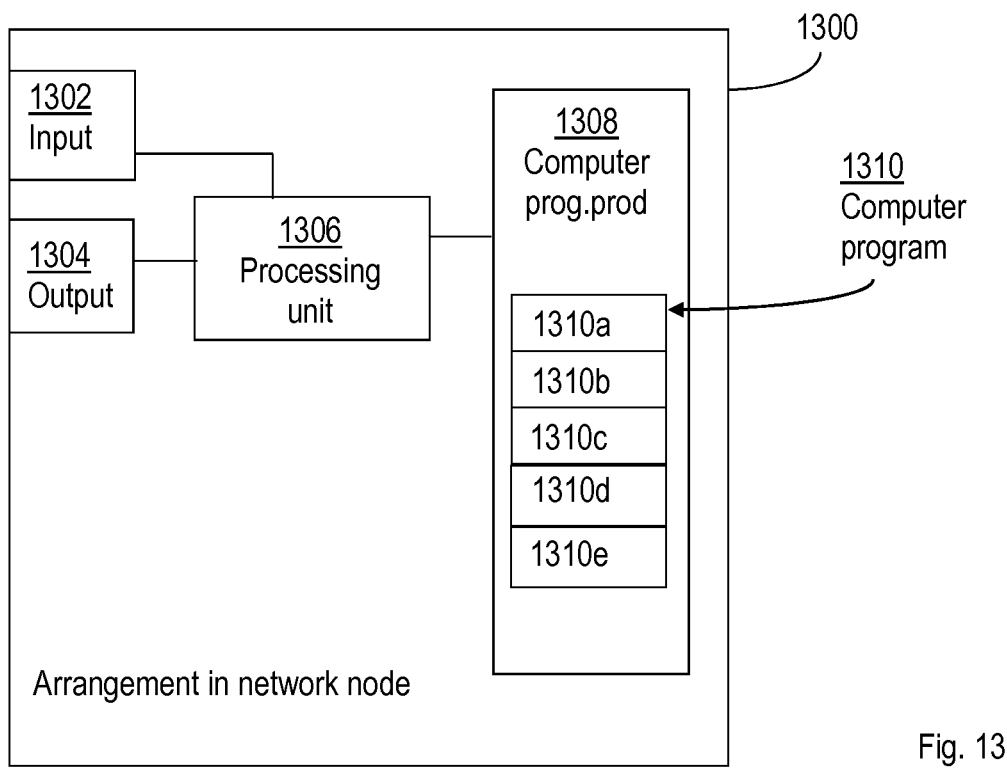
FIG. 13 is a block diagram of an arrangement in a network node for supporting random access with a first wireless device acting as a coordinator for a group of wireless devices comprising the first wireless device and at least a second wireless device, according to an exemplifying embodiment.

FIG. 13 schematically shows an embodiment of an arrangement 1300 in a network node 1000. Comprised in the arrangement 1300 in the network node 1000 are here a processing unit 1306, e.g. with a DSP. The processing unit 1306 may be a single unit or a plurality of units to perform different actions of procedures described herein. The arrangement 1300 of the network node 1000 may also comprise an input unit 1302 for receiving signals from other entities, and an output unit 1304 for providing signal(s) to other entities. The input unit and the output unit may be arranged as an integrated entity or as illustrated in the example of FIG. 10, as one or more interfaces 1001.

Furthermore, the arrangement 1300 in the network node 1000 comprises at least one computer program product 1308 in the form of a non-volatile memory, e.g. an EEPROM, a flash memory and a hard drive. The computer program product 1308 comprises a computer program 1310, which comprises code means, which when executed in the processing unit 1306 in the arrangement 1300 in the network node 1000 causes the network node 1000 to perform the actions e.g. of the procedure described earlier in conjunction with FIGS. 3*a*-3*d*.

The computer program 1310 may be configured as a computer program code structured in computer program modules 1310*a*-1310*e*. Hence, in an exemplifying embodiment, the code means in the computer program of the arrangement 1300 in the network node 1000 comprises a sending unit, or module for sending to the first wireless device and the one or more second wireless devices, a configuration that the first wireless device and one or more second wireless devices are part of a group, and that the first wireless device shall act as a coordinator for the group by using D2D. The computer program further comprises a receiving unit, or module, for receiving a random access request from the first wireless device, which random access request relates to one or more resource requests that the first wireless device has received via a D2D link from the one or more second wireless devices in the group.

The computer program modules could essentially perform the actions of the flow illustrated in FIGS. 3*a*-3*d*, to emulate the network node 1000. In other words, when the different computer program modules are executed in the processing unit 1306, they may correspond to the units 1003-1006 of FIG. 10.

Although the code means in the embodiments disclosed above in conjunction with FIGS. 6, 8 and 10 are implemented as computer program modules which when executed in the respective processing unit causes the first wireless device, the second wireless device and the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within first wireless device, the second wireless device and the network node respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a first wireless device for requesting resources from a network node, wherein the first wireless device, one or more second wireless devices and the network node are operable in a wireless communication network, the method comprising:
   receiving from the network node, configuration information indicating that the first wireless device and one or more second wireless devices are part of a group, and that the first wireless device shall act as a coordinator for the group, wherein wireless devices in the group are capable of direct mode communication (D2D);
   receiving one or more resource requests from respective one or more second wireless devices in the group, wherein each one of the resource requests are received over a D2D link between the first wireless device and the respective one or more second wireless devices; and
   transmitting a random access request to the network node, which random access request relates to requested resources according to the received one or more resource requests from the group, wherein the random access request comprises aggregated resource requests from the one or more second wireless devices that have data to transmit.

2. The method of claim 1, further comprising receiving an indication from the network node indicating that the group is active.

3. The method of claim 1, wherein the respective resource request from the one or more second wireless devices in the group comprises a Buffer Status Report (BSR) and wherein the first wireless device reports the aggregated BSR to the network node during the random access request procedure.

4. The method of claim 1, wherein the random access request uses a random access preamble indicating that the random access request is a random access request for a group of wireless devices.

5. The method of claim 1, further comprising starting a timer, when receiving a first resource request from a second wireless device in the group for which the first wireless device acts as a coordinator after a reset of the timer, and postponing the transmitting of the random access request until the timer expires.

6. The method of claim 5, further comprising stopping the timer once it expires and/or the random access request is transmitted to the network node.

7. The method of claim 1, further comprising incrementing a counter indicative of a number of received resource requests from respective one or more second wireless devices in the group and postponing the transmitting of the random access request until the counter has reached a maximum value of received resource requests to be aggregated into the random access request.

8. The method of claim 7, wherein the method further comprises setting the counter to zero when the maximum number of resource requests is reached, and when the random access request is transmitted to the network node.

9. The method of claim 1, further comprising receiving, from the network node, a random access response comprising a resource assignment and a group temporary Cell Radio Network Temporary Identity (group TC-RNTI) and dividing the resources between the wireless devices associated with the transmitted random access request by transmitting, via respective D2D link, a respective resource allocation message comprising the group TC-RNTI to the respective wireless devices associated with the random access request.

10. The method of claim 1, further comprising transmitting a connection request message to the network node, the connection request comprising a group TC-RNTI and an identifier of the first wireless device in a Media Access Control (MAC) control element; and receiving a response from the network node indicating whether or not the connection setup is successful, wherein the group TC-RNTI is promoted to group C-RNTI if the connection setup is successful, wherein the received response also comprises a timing advance value for the first wireless device.

11. A method performed by a second wireless device for requesting resources from a network node, wherein a first wireless device, the second wireless device and a network node are operable in the wireless communication network, the method comprising:
   receiving from the network node, configuration information indicating that the first wireless device and the second wireless device are part of a group, and that the first wireless device shall act as a coordinator for the group, wherein wireless devices in the group are capable of direct mode communication (D2D);
   requesting resources from the network node by transmitting, over a D2D link, a resource request to the first wireless device, for being forwarded in a random access request to the network node together with any resource requests from respective one or more other second wireless devices in the group;
   receiving a resource allocation, via a D2D link from the first wireless device, comprising a group Cell Radio Network Temporary Identity (group C-RNTI);
   transmitting a connection request message to the network node, the connection request comprising the group C-RNTI and an identifier of the second wireless device in a Media Access Control (MAC) control element; and
   transmitting one or more subsequent transmissions to the network node, each of the one or more subsequent transmissions including the group C-RNTI and the identifier of the second wireless device, in the MAC control element.

12. The method of claim 11, further comprising receiving an indication from the network node, indicating that the group is active.

13. The method of claim 11, further comprising adjusting a timing advance value using an estimated offset representative of a delay between the first and the second wireless device together with a timing advance value of the first wireless device, wherein the transmitting of the connection request message comprises transmitting the message to the network node in accordance with the adjusted timing advance value.

14. The method of claim 11, further comprising receiving a response from the network node indicating whether or not the connection setup is successful, and wherein the response comprises a timing advance value for the second wireless device when the connection setup is successful.

15. A method performed by a network node for supporting a first wireless device and one or more second wireless devices requesting resources from the network node, wherein the first wireless device, the one or more second wireless devices and the network node are operable in the wireless communication network, the method comprising:
   determining that the first wireless device shall act as a coordinator for a group of wireless devices including the first wireless device and the one or more second devices, based on which wireless device in the group is associated with the best channel quality;
   sending to the first wireless device and the one or more second wireless devices, configuration information indicating that the first wireless device and one or more second wireless devices are part of a group, and that the first wireless device shall act as a coordinator for the group by using direct mode communication (D2D); and
   receiving a random access request from the first wireless device, which random access request relates to one or more resource requests that the first wireless device has received via a D2D link from the one or more second wireless devices in the group.

16. The method of claim 15, further comprising, when a random access load becomes higher than a threshold, transmitting an indication to the first wireless device and the one or more second wireless devices that the group is active.

17. The method of claim 15, further comprising:
   transmitting a random access response comprising a resource assignment, a group temporary Cell Radio Network Temporary Identity (group TC-RNTI) and timing advance value, to the first wireless device for distribution via a respective D2D link to the one or more second wireless devices in the group.

18. The method of claim 17, further comprising receiving respective connection requests from wireless devices having requested access to the network node by means of the random access request, and transmitting respective response message to the wireless devices requesting connection.

19. The method of claim 18, wherein the respective connection request messages comprise the group C-RNTI and respective identifier of the respective wireless devices in a Media Access Control (MAC) control element.

20. The method of claim 18, wherein the respective response message comprises respective timing advance value for the respective wireless device.

21. The method of claim 15, wherein the random access request comprises a preamble indicating that it is a group of wireless devices and not a single wireless device requesting access to the network node.

22. The method of claim 15, further comprising assigning or changing a value of a timer, indicating a time the first wireless device has to wait from receiving a first resource request until sending the random access request; and/or assigning or changing a value of a maximum number of wireless devices, requesting access by means of the random access request; and transmitting the value(s) of the timer and/or the counter to the first wireless device.

23. A first wireless device for requesting resources from a network node, wherein the first wireless device, one or more second wireless devices and the network node are operable in a wireless communication network, the first wireless device being configured to
   receive from the network node, a configuration that the first wireless device and one or more second wireless devices are part of a group, and that the first wireless device shall act as a coordinator for the group, wherein wireless devices in the group are capable of direct mode communication (D2D);
   receive one or more resource requests from respective one or more second wireless devices in the group, wherein each one of the resource requests are received over a D2D link, between the first wireless device and the respective one or more second wireless devices; and
   transmit a random access request to the network node, which random access request relates to requested resources according to the received one or more resource requests from the group, wherein the random access request comprises aggregated resource requests from the one or more second wireless devices that have data to transmit.

24. The first wireless device of claim 23, further being configured to receive an indication from the network node indicating that the group is active.

25. The first wireless device of claim 23, wherein the respective resource request from the one or more second wireless devices in the group comprises a Buffer Status Report (BSR) and wherein the first wireless device is configured to report the aggregated BSR to the network node during the random access request procedure.

26. The first wireless device of claim 23, wherein the random access request uses a random access preamble indicating that the random access request is a random access request for a group of wireless devices.

27. The first wireless device of claim 23, further being configured to start a timer, when receiving a first resource request from a second wireless device in the group for which the first wireless device acts as a coordinator after a reset of the timer, and to postpone the transmitting of the random access request until the timer expires.

28. The first wireless device of claim 27, further being configured to stop the timer once it expires and/or the random access request is transmitted to the network node.

29. The first wireless device of claim 23, further being configured to increment a counter indicative of a number of received resource requests from respective one or more second wireless devices in the group and to postpone the transmitting of the random access request until the counter has reached a maximum value of received resource requests to be aggregated into the random access request.

30. The first wireless device of claim 29, further being configured to set the counter to zero when the maximum number of resource requests is reached, and when the random access request is transmitted to the network node.

31. The first wireless device of claim 23, further being configured to receive, from the network node, a random access response comprising a resource assignment and a group temporary Cell Radio Network Temporary Identity (group TC-RNTI), and to divide the resources between the wireless devices associated with the transmitted random access request by transmitting, via respective D2D link, a respective resource allocation message comprising the group TC-RNTI to the respective wireless devices associated with the random access request.

32. The first wireless device of claim 23, further being configured to transmit a connection request message to the network node, the connection request comprising a group TC-RNTI and an identifier of the first wireless device in a Media Access Control (MAC) control element; and to receive a response from the network node indicating whether or not the connection setup is successful, wherein the group TC-RNTI is promoted to group C-RNTI if the connection setup is successful, wherein the received response also comprises a timing advance value for the first wireless device.

33. A second wireless device for requesting resources from a network node, wherein a first wireless device, the second wireless device and a network node are operable in the wireless communication network, the second wireless device being configured to:
receive from the network node, configuration information indicating that the first wireless device and the second wireless device are part of a group, and that the first wireless device shall act as a coordinator for the group, wherein wireless devices in the group are capable of direct mode communication, (D2D);
request resources from the network node by transmitting over a D2D link, a resource request to the first wireless device, for being forwarded in a random access request to the network node together with any resource requests from respective one or more other second wireless devices in the group;
receive a resource allocation, via a D2D link from the first wireless device, comprising a group Cell Radio Network Temporary Identity (group C-RNTI);
transmit a connection request message to the network node, the connection request comprising the group C-RNTI and an identifier of the second wireless device in a Media Access Control (MAC) control element; and
transmit one or more subsequent transmissions to the network node, each of the one or more subsequent transmissions including the group C-RNTI and the identifier of the second wireless device, in the MAC control element.

34. The second wireless device of claim 33, further being configured to receive an indication from the network node, indicating that the group is active.

35. The second wireless device of claim 33, further being configured to adjust a timing advance value using an estimated an offset representative of a delay between the first and the second wireless device together with a timing advance value of the first wireless device, wherein the second wireless device is configured to transmit the connection request message by transmitting the message to the network node in accordance with the adjusted timing advance value.

36. The second wireless device of claim 33, further being configured to receive a response from the network node indicating whether or not the connection setup is successful, and wherein the response comprises a timing advance value for the second wireless device when the connection setup is successful.

37. A network node for supporting a first wireless device and one or more second wireless devices requesting resources from the network node, wherein the first wireless device, the one or more second wireless devices and the network node are operable in the wireless communication network, the network node being configured to:
determine that the first wireless device shall act as a coordinator for a group of wireless devices including the first wireless device and the one or more second wireless devices, based on which wireless device in the group that is associated with the best channel quality;
send, to the first wireless device and the one or more second wireless devices, configuration information indicating that the first wireless device and one or more second wireless devices are part of a group, and that the first wireless device shall act as a coordinator for the group by using direct mode communication (D2D); and
receive a random access request from the first wireless device, which random access request relates to one or more resource requests that the first wireless device has received via a D2D link from the one or more second wireless devices in the group.

38. The network node of claim 37, further being configured to, when a random access load becomes higher than a threshold, transmit, to the first wireless device and the one or more second wireless devices, an indication that the group is activated.

39. The network node of claim 37, further being configured to:

transmit a random access response comprising a resource assignment, a group temporary Cell Radio Network Temporary Identity (group TC-RNTI) and timing advance value, to the first wireless device for distribution via a respective D2D link to the one or more second wireless devices in the group.

40. The network node of claim 39, further being configured to receive respective connection requests from wireless devices having requested access to the network node by means of the random access request, and to transmit respective response message to the wireless devices requesting connection.

41. The network node of claim 40, wherein the respective connection request messages comprise the group C-RNTI and respective identifier of the respective wireless devices in a Media Access Control (MAC) control element.

42. The network node of claim 40, wherein the respective response message comprises respective timing advance value for the respective wireless device.

43. The network node of claim 37, wherein the random access request comprises a preamble indicating that it is a group of wireless devices and not a single wireless device requesting access to the network node.

44. The network node of claim 37, further being configured to assign or change a value of a timer, indicating a time the first wireless device has to wait from receiving a first resource request until sending the random access request; and/or assign or change a value of a maximum number of wireless devices requesting access by means of the random access request; and to transmit the value(s) of the timer and/or the counter to the first wireless device.

\* \* \* \* \*